United States Patent
Chawla et al.

(10) Patent No.: US 10,401,488 B2
(45) Date of Patent: Sep. 3, 2019

(54) REAL-TIME RFID LOCALIZATION USING UNIFORM, HIGH-PERFORMANCE TAGS AND RELATED METHOD THEREOF

(71) Applicants: University of Virginia Patent Foundation, Charlottesville, VA (US); Kirti Chawla, Charlottesville, VA (US); Gabriel Robins, Charlottesville, VA (US)

(72) Inventors: Kirti Chawla, Charlottesville, VA (US); Gabriel Robins, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 799 days.

(21) Appl. No.: 14/899,399

(22) PCT Filed: Jun. 24, 2014

(86) PCT No.: PCT/US2014/043894
§ 371 (c)(1),
(2) Date: Dec. 18, 2015

(87) PCT Pub. No.: WO2014/210022
PCT Pub. Date: Dec. 31, 2014

(65) Prior Publication Data
US 2016/0146934 A1    May 26, 2016

Related U.S. Application Data

(60) Provisional application No. 61/839,617, filed on Jun. 26, 2013, provisional application No. 61/972,912, filed on Mar. 31, 2014.

(51) Int. Cl.
*G01S 13/74* (2006.01)
*G01S 5/02* (2010.01)
(Continued)

(52) U.S. Cl.
CPC .............. *G01S 13/74* (2013.01); *G01S 5/021* (2013.01); *G01S 5/14* (2013.01); *G01S 11/06* (2013.01)

(58) Field of Classification Search
CPC . G01S 13/74; G01S 5/021; G01S 5/14; G01S 5/02; G01S 11/02; G01S 11/04; G01S 11/06
(Continued)

(56) References Cited

U.S. PATENT DOCUMENTS 5,977,913 A    11/1999  Christ
6,641,042 B1   11/2003  Pierenkemper
(Continued)

FOREIGN PATENT DOCUMENTS

WO    WO 2007/061836    5/2007
WO    WO 2007/131839    11/2007
(Continued)

OTHER PUBLICATIONS

Arumugam et al., "Characteristics of Passive UHF RFID Tags on Metal Slabs", Proc. of the IEEE Antennas and Propagation Society International Symposium, South Carolina, 2009, pp. 1-4.
(Continued)

*Primary Examiner* — Harry K Liu
(74) *Attorney, Agent, or Firm* — Robert J. Decker

(57) ABSTRACT

Disclosed herein are systems, methods, and machine readable media that enable object localization with an RFID infrastructure. Localization is performed by modeling the distance-decaying behavior of received signal strength. Selection of optimally performing tag types and the use of uniformly sensitive tags of those optimal tag types further enhances localization accuracy. When these components are combined, RFID becomes a feasible way to locate moving and stationary objects in a 3D environment that includes other objects, as well as noise and signal pollution.

86 Claims, 15 Drawing Sheets

(51) Int. Cl.
*G01S 5/14* (2006.01)
*G01S 11/06* (2006.01)

(58) Field of Classification Search
USPC .......................................................... 342/458
See application file for complete search history.

(56) References Cited

U.S. PATENT DOCUMENTS

| | | | |
|---|---|---|---|
| 7,119,738 | B2 | 10/2006 | Bridgelall |
| 7,246,746 | B2 | 7/2007 | McNamara |
| 7,295,114 | B1 | 11/2007 | Drzaic |
| 7,319,397 | B2 | 1/2008 | Chung |
| 7,374,103 | B2 | 5/2008 | Genc |
| 7,486,189 | B2 | 2/2009 | Koerner |
| 7,522,926 | B2 | 4/2009 | Chu |
| 7,605,688 | B1 | 10/2009 | Seah |
| 7,619,532 | B2 | 11/2009 | Amir |
| 7,683,782 | B2 | 3/2010 | Christopher |
| 7,693,681 | B2 | 4/2010 | Yamada |
| 9,977,112 | B2 | 5/2018 | Chawla |
| 2006/0022815 | A1 | 2/2006 | Fischer |
| 2006/0125694 | A1 | 6/2006 | Dejanovic |
| 2006/0273903 | A1 | 12/2006 | Kim |
| 2007/0115137 | A1 | 5/2007 | Lyon |
| 2008/0061939 | A1 | 3/2008 | Davis |
| 2008/0100439 | A1 | 5/2008 | Rinkes |
| 2008/0278289 | A1 | 11/2008 | Gantner |
| 2009/0315679 | A1 | 12/2009 | Bauchot |
| 2010/0039230 | A1* | 2/2010 | Voutilainen ........ G01R 31/2822 340/10.1 |
| 2010/0052857 | A1 | 3/2010 | Ozeki |
| 2010/0060425 | A1* | 3/2010 | Rodriguez ............... H04Q 9/00 340/10.1 |
| 2010/0070211 | A1 | 3/2010 | Surette |
| 2010/0090804 | A1* | 4/2010 | Gruber ................. G06K 7/0008 340/10.2 |
| 2010/0295943 | A1* | 11/2010 | Cha ......................... G01S 13/82 348/143 |
| 2011/0159886 | A1* | 6/2011 | Kangas ................... H04W 4/02 455/456.1 |
| 2011/0234377 | A1* | 9/2011 | Landuyt ............. G06K 7/10138 340/10.1 |
| 2011/0260923 | A1 | 10/2011 | Liao |
| 2012/0056720 | A1 | 3/2012 | Barvick |
| 2012/0238218 | A1* | 9/2012 | Stine ..................... H04W 16/00 455/67.11 |
| 2013/0181869 | A1* | 7/2013 | Chawla ................ G06K 7/0008 342/451 |
| 2013/0201003 | A1* | 8/2013 | Sabesan ..................... G01S 7/42 340/10.1 |
| 2014/0347168 | A1* | 11/2014 | Sanders ................... G01S 13/74 340/10.4 |

FOREIGN PATENT DOCUMENTS

| | | |
|---|---|---|
| WO | WO 2009/018156 | 2/2009 |
| WO | WO 2010/011176 | 1/2010 |
| WO | WO 2011/135328 | 11/2011 |
| WO | WO 2012/047559 | 4/2012 |

OTHER PUBLICATIONS

Bekkali et al., "RFID Indoor Positioning based on Probabilistic RFID Map and Kalman Filtering", Proceedings of the IEEE International Conference on Wireless and Mobile Computing (WiMob2007), Networking and Communications, New York, 2007, pp. 21-27, 7 pages.

Bolotnyy et al., "Multi-Tag RFID Systems", Proceedings of the International Journal of Internet Protocol Technology, special issue on RFID: Technologies, Applications, and Trends, Dec. 2007, pp. 218-231, vol. 2, No. 3/4.

Bolotnyy et al., "The Case for Multi-tag RFID Systems", Proceedings of the IEEE International Conference on Wireless Algorithms, Systems and Applications, Chicago, 2007, pp. 174-186, 13 pages.

Bouet et al., "RFID Tags: Positioning Principles and Localization Techniques", Proceedings of the Wireless Days, Dubai, UAE, 2008, pp. 1-5.

Brchan et al., "A Real-Time RFID Localization Experiment Using Propagation Models", Proceedings of the IEEE International Conference on RFID, Florida, 2012, pp. 141-148, 8 pages.

Chawla et al., "An RFID-Based Object Localisation Framework", Proc. of the International Journal on Radio Frequency Identification Technology and Applications, 2011, pp. 2-30, vol. 3, Nos. 1/2.

Chawla et al., "Efficient RFID-Based Mobile Object Localization", IEEE International Workshop on Selected Topics in Mobile and Wireless Computing, 2010, pp. 683-690.

Chawla et al., "Object Localization Using RFID", 2010 5th International Symposium on Wireless Pervasive Computing (ISWPC), 2010, pp. 301-306.

Choi et al., "Localization Systems Using Passive UHF RFID", Proceedings of the IEEE International Joint Conference on INC, IMS and IDC, Seoul, South Korea, 2009, pp. 1727-1732.

Finkenzeller, "RFID-Handbook: Fundamentals and Applications in Contactless Smart Cards, Radio Frequency Identification and Near-Field Communication", 2010, Wiley and Sons Inc., Third Edition, 480 pages.

Hanel et al., "Mapping and Localization with RFID Technology", Proceedings of 2004 IEEE International Conference on Robotics & Automation, New Orleans, Apr. 2004, pp. 1015-1020.

He et al., "Range-Free Localization and its Impact on Large Scale Sensor Networks", ACM Transactions on Embedded Computing Systems, 2005, pp. 877-906, vol. 4, No. 4.

Heikimian-Williams et al., "Accurate Localization of RFID Tags Using Phase Difference", IEEE RFID 2010, pp. 89-96.

Hightower et al., "Location Systems for Ubiquitous Computing", Proceedings of the IEEE Computer, 2001, pp. 57-66, vol. 34, No. 8.

Hightower et al., "SpotON: An Indoor 3D Location Sensing Technology Based on RF Signal Strength", Feb. 18, 2000, pp. 1-16, UW CSE Technical Report #2000-02-02.

Ni et al., "LANDMARC: Indoor Location Sensing Using Active RFID", Wireless Networks 10, 2004, pp. 701-710, Kluwer Academic Publishers, Manufactured in The Netherlands.

Ni et al., "LANDMARC: Indoor Location Sensing Using Active RFID", Proceedings of the IEEE International Conference on Pervasive Computing and Communications (PerCom'03), Texas, 2003, pp. 407-415, 9 pages.

Nikitin et al., "Antennas and Propagation in UHF RFID Systems", Proceeding of the IEEE International Conference on RFID, Nevada, 2008, pp. 277-288.

Retscher et al., "Integration of RFID, GNSS and DR for Ubiquitous Positioning in Pedestrian Navigation", Journal of Global Positioning Systems, 2007, pp. 56-64, vol. 6, No. 1.

Saarinen et al., "Effects of Cycling Humidity on the Performance of RFID Tags With ACA Joints", Proceedings of the IEEE Transactions on Reliability, 2012, pp. 23-31, vol. 61, No. 1.

Wang et al., "RFID-Based 3-D Positioning Schemes", IEEE INFOCOM 2007 proceedings, 2007, pp. 1235-1243.

Wu, "Three-Dimensional Indoor RFID Localization System", Dissertation, Dec. 2012, University of Nebraska, 199 pages.

Yang et al., "Quality of Trilateration: Confidence-Based Iterative Localization", Proceedings of the IEEE Transactions on Parallel and Distributed Systems, 2010, pp. 631-640, vol. 21, No. 5.

Zhang et al., "Localization and Tracking of Passive RFID Tags Based on Direction Estimation", International Journal of Antennas and Propagation, 2007, pp. 1-9, Article ID 17426.

* cited by examiner

REAL-TIME RFID LOCALIZATION USING UNIFORM, HIGH-PERFORMANCE TAGS AND RELATED METHOD THEREOF

CROSS REFERENCE TO RELATED APPLICATIONS

The present application is a national stage filing of International Application No. PCT/US2014/043894, filed Jun. 24, 2014, which claims benefit of priority under 35 U.S.C. § 119(e) from U.S. Provisional Application Ser. No. 61/839,617, filed Jun. 26, 2013, entitled "Real-Time RFID Localization Using Received Signal Strength (RSS) System and Related Method" and U.S. Provisional Application Ser. No. 61/972,912, filed Mar. 31, 2014, entitled " Real-Time RFID Localization Using Received Signal Strength (RSS) System and Related Method;" the disclosures of which are hereby incorporated by reference herein in their entirety.

STATEMENT OF GOVERNMENT INTEREST

This invention was made with U.S. Government Support under National Science Foundation (NSF) Grant No. 0716635. The government has certain rights in the invention.

The present application is related to International Patent Application Serial No. PCT/US2011/053067, Chawla, et al., entitled "Object Localization with RFID Infrastructure," filed Sep. 23, 2011, and U.S. patent application Ser. No. 13/876,078, Chawla, et al., "Object Localization with RFID Infrastructure," filed Mar. 26, 2013; the disclosures of which are hereby incorporated by reference herein in their entirety.

TECHNICAL FIELD

The present invention relates generally to the field of object localization with an RFID infrastructure. More specifically, the present invention deals with providing systems and methods for locating objects with attached RFID tags by modeling the decay of received signal strength over increasing distance between the RFID tag and reader.

BACKGROUND

Object localization within a physical space (e.g., a box in a warehouse) has generally involved manually tracking the object. For example, such manual tracking can include scanning a location barcode when storing or moving the object in the warehouse. Attempts to automate object localization have included using radio-frequency identification (RFID) systems. RFID systems generally employ one or more RFID readers that wirelessly interrogate one or more RFID tags. RFID tags can be passive, battery-assisted passive, or active. Generally, RFID tags receiving an interrogatory signal from an RFID reader will respond with information that can be used to uniquely identify the RFID tag. RFID readers are generally designed and installed so as to cover a specified physical area (e.g., a shopping cart at a checkout register). The physical area is generally limited to a region where the RFID can reliably interrogate tags (e.g., RFID tags associated with the goods in the shopping cart). Thus, RFID systems generally perform object tracking (i.e., whether an object passed through an area) rather than object localization.

SUMMARY OF EXEMPLARY EMBODIMENTS OF THE INVENTION

The present inventors recognize that new computing paradigms have underscored the need to locate objects in an environment, motivating several object localization approaches targeting competing technologies and specific applications. While certain radio-frequency identification (RFID) system technologies may provide a viable platform for locating objects, several unresolved key challenges precluded higher performance and wider applicability. An aspect of an embodiment of the present invention provides, but not limited thereto, an RFID-based real-time location system (and related method and computer readable medium) that uses received signal strength (RSS) to better model the distance-decaying behavior of radio signals in an orientation-agnostic manner.

For example, the present inventors experimentally leveraged the proposed robust models to simultaneously locate several stationary and mobile objects tagged with passive tags in a realistically noisy indoor environment, with an average accuracy of 0.6 meters. Contrary to common belief, RSS can indeed serve as reliable metric for a variety of select applications, including object localization.

An aspect of an embodiment of the present invention provides, among other things, a method of selecting a type of radio-frequency identification (RFID) tag. The method may comprise: providing a plurality of RFID tags, wherein the plurality of RFID tags is comprised of at least two different RFID tag types; measuring the received signal strength (RSS) of the plurality of RFID tags for at least one RFID reader power level and at least one reader-tag distance, wherein the reader-tag distance is the distance between an RFID reader and an RFID tag; and analyzing the measured RSS of the plurality of RFID tags to select the optimal RFID tag type.

An aspect of an embodiment of the present invention provides, among other things, a method of developing a received signal strength (RSS) decay model for a radio-frequency identification (RFID) system. The method may comprise: measuring RSS of one or more RFID tags at a plurality of tag-reader distances and a plurality of orientations with respect to the RFID reader, wherein the tag-reader distance is the distance between an RFID reader and an RFID tag; and fitting the RSS measurements to an exponential decay formula to provide the RSS decay model, wherein the exponential decay formula relates increasing tag-reader distance to decreasing RSS.

An aspect of an embodiment of the present invention provides, among other things, a system that may comprise: a tag testing circuit configured to measure the received signal strength (RSS) of a plurality of RFID tags for at least one RFID reader power level and at least one reader-tag distance, wherein the plurality of RFID tags is comprised of at least two different RFID tag types; and a tag selection circuit configured to analyze the measured RSS of the plurality of RFID tags to select the optimal RFID tag type.

An aspect of an embodiment of the present invention provides, among other things, a system that may comprise: an RSS measurement circuit configured to measure the RSS of one or more RFID tags at a plurality of tag-reader distances and a plurality of orientations with respect to the RFID reader, wherein the tag-reader distance is the distance between an RFID reader and an RFID tag; and a calibration circuit configured to fit the RSS measurements to an exponential decay formula to provide an RSS decay model, wherein the exponential decay formula relates increasing tag-reader distance to decreasing RSS.

An aspect of an embodiment of the present invention provides, among other things, a non-transitory machine-readable medium, including instructions, which when executed by a machine, cause the machine to: measure the received signal strength (RSS) of a provided plurality of RFID tags for at least one RFID reader power level and at least one reader-tag distance, wherein the plurality of RFID tags is comprised of at least two different RFID tag types, and wherein the reader-tag distance is the distance between an RFID reader and an RFID tag; and analyze the measured RSS of the plurality of RFID tags to select the optimal RFID tag type.

An aspect of an embodiment of the present invention provides, among other things, a non-transitory machine-readable medium, including instructions, which when executed by a machine, cause the machine to: measure RSS of one or more RFID tags at a plurality of tag-reader distances and a plurality of orientations with respect to the RFID reader, wherein the tag-reader distance is the distance between an RFID reader and an RFID tag; and fit the RSS measurements to an exponential decay formula to provide an RSS decay model, wherein the exponential decay formula relates increasing tag-reader distance to decreasing RSS.

An aspect of an embodiment of the present invention provides, among other things, a non-transitory machine-readable medium, including instructions, which when executed by a machine, cause the machine to: measure the received signal strength (RSS) of a plurality of radio frequency identification (RFID) tags of at least two different types; select the optimal RFID tag type by analyzing the measured RSS of the plurality of RFID tags; measure the RSS of a plurality of RFID tags of the optimal RFID tag type; identify a subset of RFID tags of the plurality of RFID tags of the optimal RFID tag type that perform closest to the mean on a particular metric; measure the RSS of the subset of RFID tags at a plurality of tag-reader distances and one or more orientations with respect to the RFID reader, wherein the tag-reader distance is the distance between an RFID reader and an RFID tag; and fit the RSS measurements of the subset of RFID tags to an RSS decay model that relates increasing tag-reader distance to decreasing RSS.

An aspect of an embodiment of the present invention provides, among other things, systems, methods, and machine readable media that enable object localization with an RFID infrastructure. Localization is performed by modeling the distance-decaying behavior of received signal strength. Selection of optimally performing tag types and the use of uniformly sensitive tags of those optimal tag types further enhances localization accuracy. When these components are combined, RFID becomes a feasible way to locate moving and stationary objects in a 3D environment that includes other objects, as well as noise and signal pollution.

The present inventors recognize that locating objects is a key requirement in many emerging computing paradigms. Active object localization research has shown that different technologies such as sensors, WiFi, lasers, and GNSS, combined with techniques based on signal arrival time, signal phase, and signal strength can be used to locate objects in an environment.

The present inventors recognize that radio frequency identification (RFID) technology has demonstrated a potential for locating objects, particularly in indoor environments. The present inventors realize that while standard RFID technology does not provide object localization capabilities, if this was made possible, it would avoid several drawbacks of other localization technologies, including a need for a direct line of sight, a well-lit environment, a lack of occluding obstacles, and radio signal availability. Furthermore, RFID can potentially be combined with GNSS-based location systems to provide wider terrestrial coverage and higher performance.

Among certain RFID-based object localization approaches, received signal strength (RSS)-based approaches estimate the tag's location by measuring the variation in the tag's backscattered signal power as the tag-reader distance varies. However, due to ambient noise sources such as environmental interferences, metal-liquid occlusions, multipath propagation, and tag detection variability, RSS-based position estimates can be unreliable and inaccurate.

The present inventors recognize that RFID tags have significant detection variability which causes interference. An aspect of an embodiment of the present invention selects tags based on their detection performance and utilizes the selected tags to develop several RSS decay models that establish the relationship between the tag-reader distance and the tag's RSS. Aspects of the various present invention models can be utilized to construct a real-time location system that can simultaneously locate multiple stationary and mobile tags in a 3D indoor environment.

The behavior of a radio signal can vary greatly in a given environment. Assuming the average environment-specific impact on the tag's RSS to be statistically invariant enables embodiments of the present invention approach to factor out the interfering environment, with improved resilience to the tag's RSS variation caused by the tag's orientation on its axis and around the reader (i.e. axial-radial orientation).

An aspect of an embodiment of the present invention demonstrates, contrary to the common belief that RSS is an unreliable parameter, that by carefully considering the deployment scenario, the tag's radio sensitivity, orientation, and distance from the reader, RSS can be used to establish a reliable empirical power-distance relationship for a variety of select applications, including object localization. An aspect of an embodiment of the present invention also demonstrates that by matching tag-reader pairs, the proposed approach can provide high localization performance without deploying tags at known positions (i.e. reference tags) to help locate the target tags.

Moreover, an aspect of an embodiment of the present invention can perform dynamic in-situ calibrations to correct for possible performance drifts in order to sustain higher localization accuracy and speeds. Thus, by minimizing the tag detection variability and constructing an interference-inclusive localization approach, an aspect of an embodiment provides reliable and high performance object localization that can be achieved in select application scenarios (e.g. warehouses).

The present inventors recognize that signal strength (and RSS)-based object localization approaches measure the radio signal's propagation distance up to the point where the signal begins to attenuate, in order to estimate the tag-reader distance. Theoretically, tag-reader radio signal strength and distance in the free-space can be defined by the Friis transmission equation as given below:

$$\frac{P_R}{P_T} \alpha G_R G_T \left(\frac{\lambda}{4\pi D}\right)^2 \quad (1)$$

where $P_R$ is the power received at the receiver (i.e. a tag) and $P_T$ is the power transmitted by the transmitter (i.e. a reader). $G_R$ and $G_T$ are respectively the antenna gains for the tag and the reader, $\lambda$ is the radio signal wavelength, and D is the tag-reader distance.

The present inventors recognize that signal strength-based object localization approaches are susceptible not only to ambient interference sources such as environmental noise, occlusions due to the presence of liquids and metals, multipath propagation, tag-reader orientations, but also to the variability inherent in radio-sensitive tags. While the environment's impact on RSS-based object localization may be acknowledged, the role of variable tag sensitivity in localization performance has surprisingly received little attention.

Certain RFID readers can report tags' RSS, which can be transformed into coarse-grained relative position estimates. Such position estimates are calculated by the RFID reader via integrating the speed and direction of motion of the tag over time with respect to a fixed reference location. Thus, such an approach cannot be used to determine a tag's absolute position with a high degree of accuracy.

To overcome the limitations of existing RSS-based object localization approaches, an aspect of an embodiment of the present invention starts with a large collection of different-type tags, and selects from it tags having the longest read range and overall most uniform RSS behavior. This is done for one or more RFID readers, in order to determine the type of tag that performs optimally with respect to each reader. Next, multiple tags of the type that best suits each reader are sorted based on the measured RSS over different combinations of reader output power levels and tag-reader distances, to ensure their uniform operational behavior. These sorted/binned tags are utilized to develop RSS decay models by characterizing their performance with respect to axial-radial orientation. Aspects of embodiments of the present invention may use any one of the three steps—selection, binning, and decay model development—by itself or any combination thereof to improve RFID object localization performance. This methodology effectively pairs readers with select tag types, and enables a real-time location system to simultaneously locate multiple stationary and mobile objects. Aspects of embodiments of the present invention may utilize passive tags, active tags, and semi-passive tags, among others.

These and other objects, along with advantages and features of various aspects of embodiments of the invention disclosed herein, will be made more apparent from the description, drawings and claims that follow.

BRIEF DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

DETAILED DESCRIPTION OF THE EXEMPLARY EMBODIMENTS

Abbreviations and Acronyms
 RFID: Radio-frequency Identification
 RSS: Received Signal Strength
Definitions
 Read Range: The maximum distance at which an RFID tag can be read by an RFID reader.
 RSS: The amount of signal power reflected back by an RFID tag to an RFID reader.
 Read Count: The total no. of successful reads of an RFID tag by an RFID reader in a given time.
 RFID tag and reader are used interchangeably with tag and reader throughout the document
Embodiments
 Characterizing a reliable relationship between a tag's RSS decay and tag-reader distance requires taking into account tag detection variability and orientation. Such characterization-driven RSS decay models are inherently tag and reader dependent. To identify tags suitable for developing such RSS decay models, an aspect of one embodiment of the present invention selects a tag type based on read range and RSS behavior. In another embodiment, tags having the longest read ranges may be selected as this tends to minimize the number of deployable readers for the targeted application scenario. Tags that have uniform RSS behavior over distance and reader output power level combinations tend to also have a graceful RSS decay and uniform localization performance.

Figure 1:
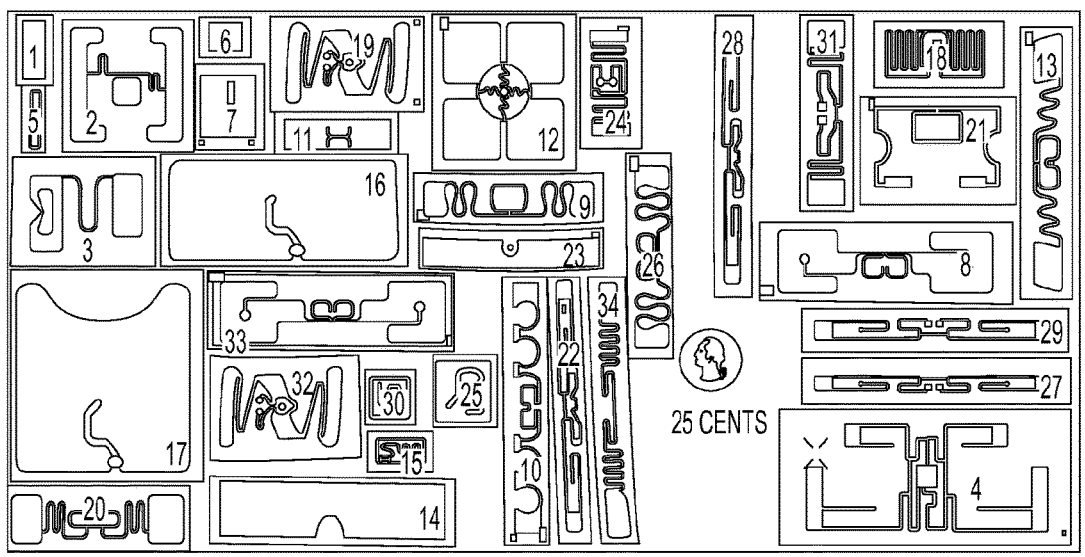
FIG. 1 illustrates an example of various tag types from which the optimally performing ones can be selected.
Figure 10:
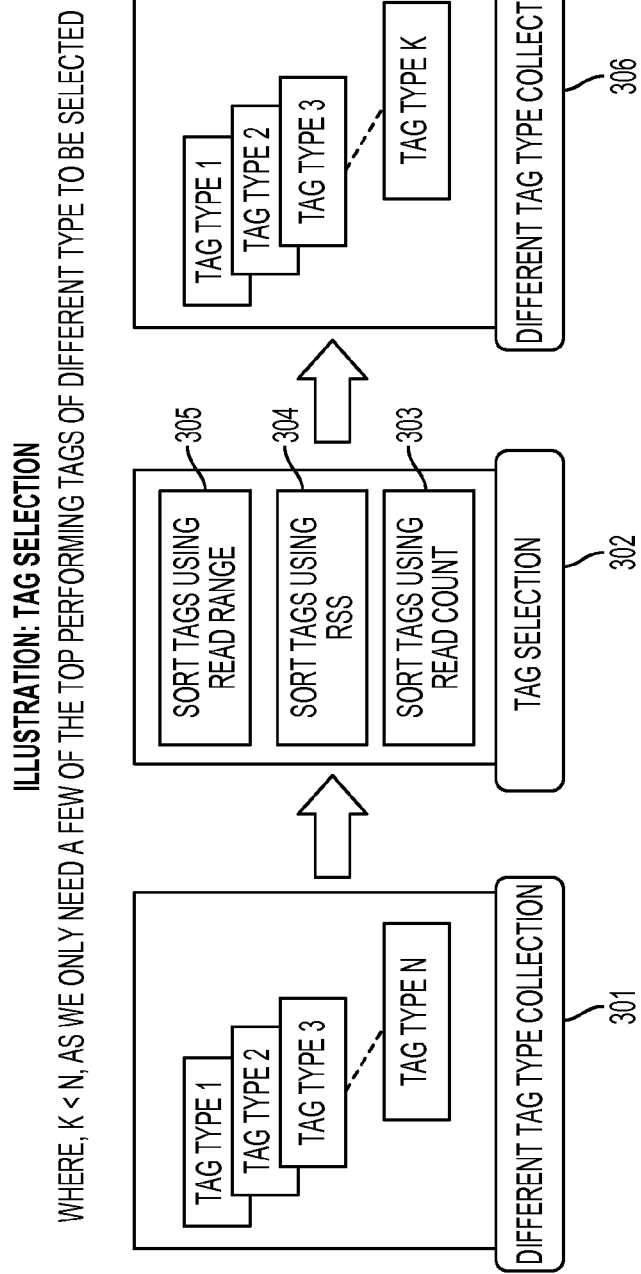
FIG. 10 is a flowchart illustrating an example of a tag type selection method.
Figure 13A:
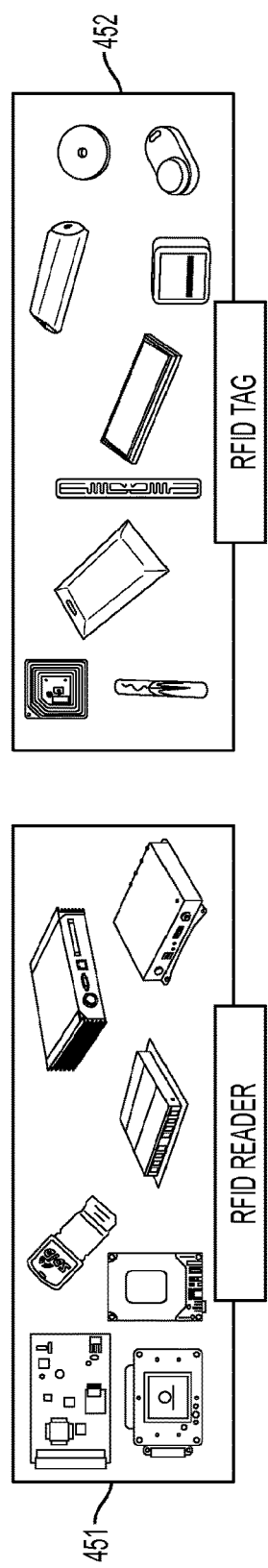
FIG. 13A illustrates an example of various RFID readers and RFID tags.

FIG. 10 illustrates an aspect of an embodiment of the present invention, whereby a type of RFID tag is selected 302 by taking a collection of different RFID tag types 301 (1-N) and measuring their RSS over a range of distances and power levels and determining which of the tag types is the most optimal. The RSS measurements are performed by a designated RFID reader. FIG. 13A illustrates examples of different kinds of RFID readers 451 that may be used. Moreover, FIG. 13A also illustrates examples of different types of RFID tags 452 that may be included in the selection process, including passive, active, and semi-passive tags. FIG. 1 illustrates various examples of passive tag types (illustrated as reference numbers 1-34) that may be tested and considered in the selection process.

The number of tag types used and the number of tags of each individual tag used may vary. For example, a single optimal tag type may be selected by measuring the RSS of 1,000 total tags consisting of 10 different tag types and 100 tags of each tag type. Additionally, the number of optimal tag types can be greater than one. FIG. 10 includes a resulting collection of different optimal tag types 306 (1-K). For example, in one embodiment of the present invention, 5 optimal tag types may be selected.

Figure 2:
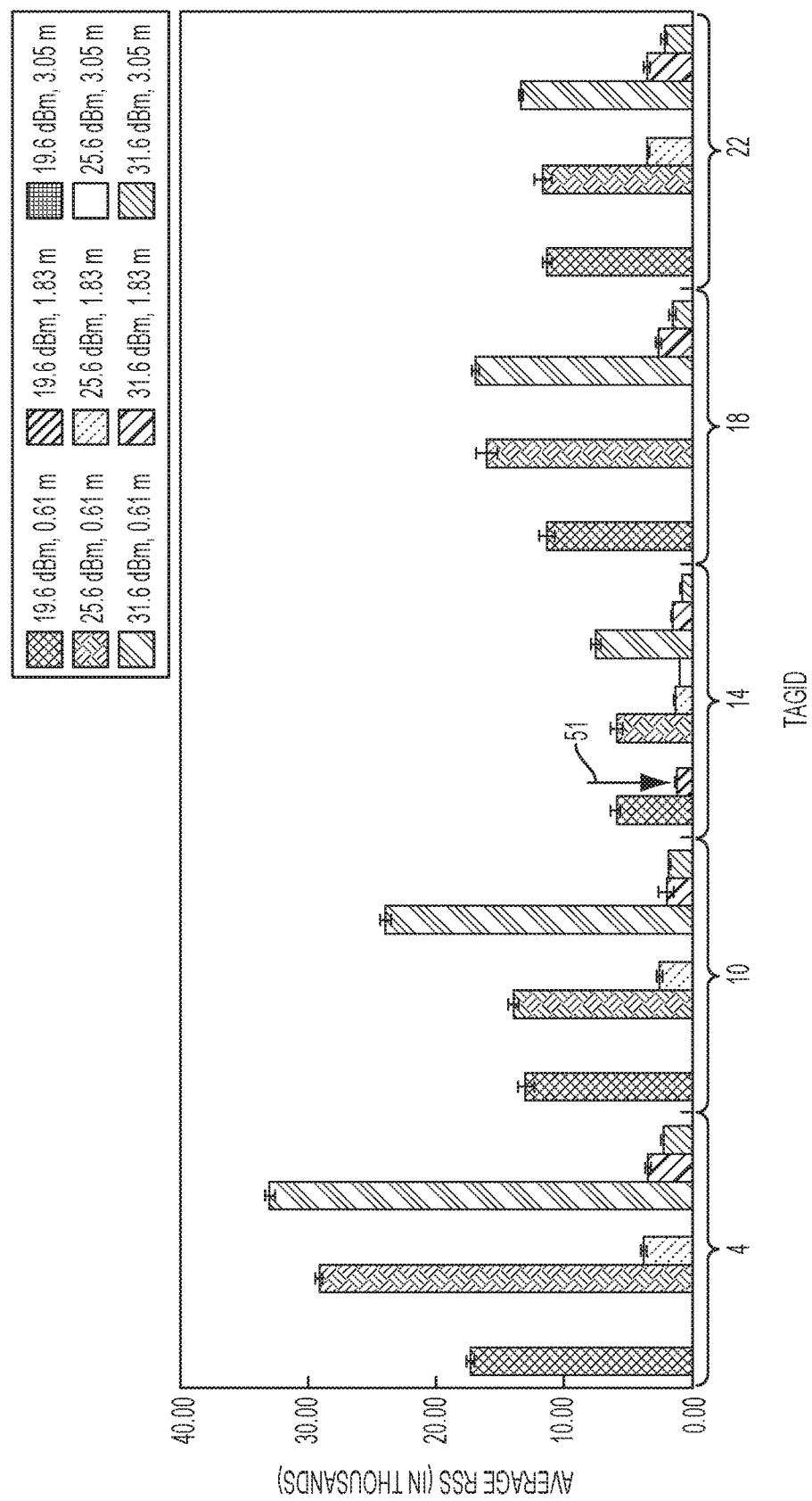
FIG. 2 illustrates an example of average RSS results for several tag types tested across multiple output power levels and tag-reader distances.

FIG. 2 illustrates that the number of distances and power levels at which RSS is measured may also be varied. For example, a single optimal tag type may be selected by measuring the RSS at 20 distances and 20 power levels. FIG. 2 shows RSS measurements for 3 distances and 3 power levels. By increasing the number of distances and power levels, the accuracy for selecting an optimal tag type may increase.

The criterion for selecting an optimal tag type may be one of many possible metrics. FIG. 10 is a flowchart including a tag selection step 302 that allows for the use of three possible metrics in determining the optimal tag type(s): read count 303, RSS 304, and read range 305. For instance, the process may include sorting the tags by three possible metrics and selecting the sorted tags. It should be appreciated that the number of metrics may be greater than or less than three. For example, in one embodiment of the present invention, an optimal tag type may be the tag type that exhibits the least variation between measured RSS 304 over different RFID reader power levels. In another embodiment of the present invention, an optimal tag type may be the tag type that allows for RSS readings at the widest range of RFID reader power level and tag-reader distance combinations. For example, FIG. 2 shows that Tag-14 was the only tag with an RSS reading 51 at a power level of 19.6 dBm and a distance of 1.83 meters. In another embodiment of the present invention, an optimal tag type may be the tag type that has the highest correlation between increases in reader-tag distance and decreases in measured RSS 304. For example, one tag type may be selected because its measured RSS 304 consistently decreases by 1 milliwatt for every increase in reader-tag distance of 1 meter. In one embodiment of the present invention, a correlation can be taken of measured RSS 304 and reader-tag distance and the tag type with the highest (or lowest) correlation coefficient may be selected as the optimal tag type.

In one embodiment of the present invention, an optimal tag type may be the tag type that has the longest read range 305. For example, the RSS of 100 tag types may be measured over a wide range of reader-tag distances and the tag type with the longest non-zero measurement may be selected as the optimal tag type. For example, if only one tag type of the 100 tag types measured has a non-zero RSS at a distance of 10 meters, it may be selected as the optimal tag type.

In one embodiment of the present invention, an optimal tag type may be the tag type that has the highest read count 303. For example, the read count 303 of 100 tag types may be measured over a wide range of reader-tag distances and the tag type with the highest read count 303 at the furthest distance may be selected as the optimal tag type. In another example, the tag type with the highest total read count 303 over all distances may be selected as the optimal tag type.

A tag's RSS behavior is not only affected by ambient interference (e.g. multipath propagation, background noise due to motors, etc.) but more importantly also by its variable radio sensitivity. Tag radio sensitivity depends on the tag antenna gain, chip high impedance state, and threshold power sensitivity. Due to manufacturing variability, small changes in the tag's onboard circuit components can cause dramatic variations in the tag's RSS behavior.

Figure 11:
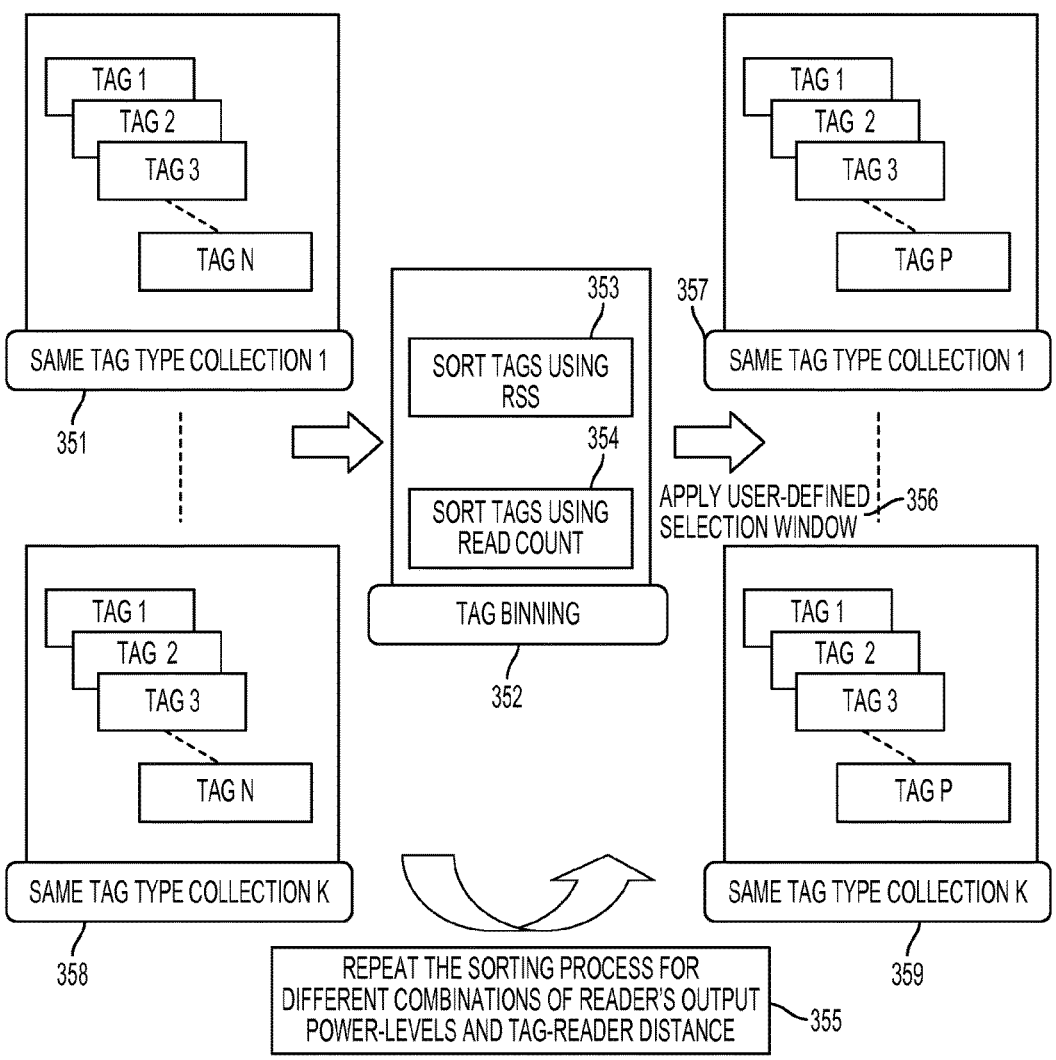
FIG. 11 is a flowchart illustrating an example of a tag binning method.

To understand the impact of a tag's variable RSS behavior on the object localization performance, consider two tags of the same type but having different RSS behavior. The tag with uniform RSS behavior will have well-defined RSS decay leading to better position estimates than the tag that has variable RSS behavior. RFID localization may be improved by performing tag binning either after tag selection, before tag selection, or in lieu of tag selection. FIG. 11 provides a flowchart of an embodiment of the present invention tag binning process.

Still referring to FIG. 11, in one embodiment of the present invention, tag binning 352 may be performed by identifying a subset of RFID tags 357 of an optimal tag type that perform closest to the mean on a particular metric. The identified subset 357 comes from testing a larger group of tags 351 of that optimal tag type. The tags that are identified in the subset 357 are kept for subsequent testing and use, and the tags that are not identified are put aside and not used immediately. In another embodiment of the present invention, this process can be repeated for each optimal tag type. For example, FIG. 11 shows a collection of tags for each of optimal tag type 1 351 through optimal tag type K 358 being whittled down through the tag binning process to the resulting collections 357, 359.

The particular metric used for binning may be one or more of many possible metrics. FIG. 11 illustrates tag binning 352 with the possibility of using two different metrics: RSS 353 or read count 354. For example, in one embodiment of the present invention, a subset of tags may be identified for having measured RSS 353 closest to the mean. Closeness of measured RSS 353 to the mean was used as the metric in the example illustrated by FIG. 3. In another example, a subset of tags may be identified for having measured read count 354 closest to the mean.

Figure 3:
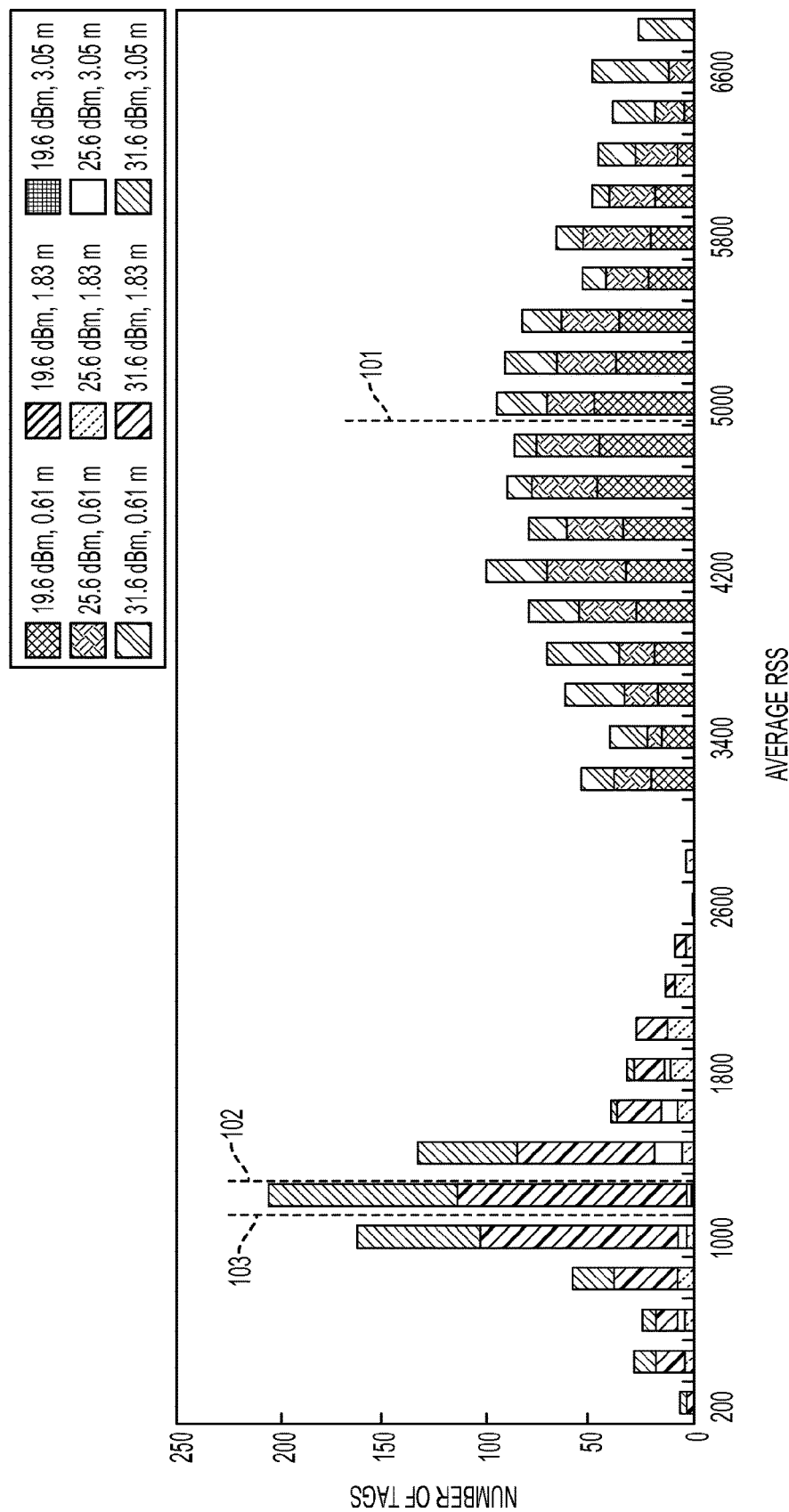
FIG. 3 illustrates an example of a binning distribution of 500 tags of the same type tested across multiple output power levels and tag-reader distances.

In one embodiment of the present invention, tag binning may be performed at various distances and at various power levels. For example, binning with respect to measured RSS may be performed at multiple reader-tag distances or only at a specific reader-tag distance. FIG. 3 illustrates an example where RSS measurements were performed at 3 reader-tag distances. A mean was established at each tag-reader distance—0.61 meters 101, 1.83 meters 102, and 3.05 meters 103—in that example. In another example, binning may be performed at multiple reader power levels or only at a specific power level. RSS measurements were performed at 3 reader power levels in FIG. 3. When RSS measurements are collected at multiple power levels and distances, FIG. 11 shows how the process of sorting the tags can be repeated 355 for different input parameters before determining which tags will be binned because they perform the most uniformly.

In one embodiment of the present invention, the number of tags that are binned may vary. For example, 1%, 50%, or 99% of the total tags may be included in the subset. Additionally, the size of the subset may be set using a predetermined number of standard deviations away from the mean. Furthermore, the size of the subset may be user-defined, which is shown in FIG. 11. A user-defined selection window may specify either the total number of tags included or the number of standard deviations away from the mean from which tags may be included. Such a selection window may be applied 356 to whittle down the larger collection of tags 351 to a more uniformly-performing collection 357.

In one embodiment of the present invention, the size of the subset may be a specified power level away from the mean. For example, from a group of 100 total tags, a subset of 10 tags may be binned because their RSS is within 3 milliwatts of the mean.

Figure 13B:
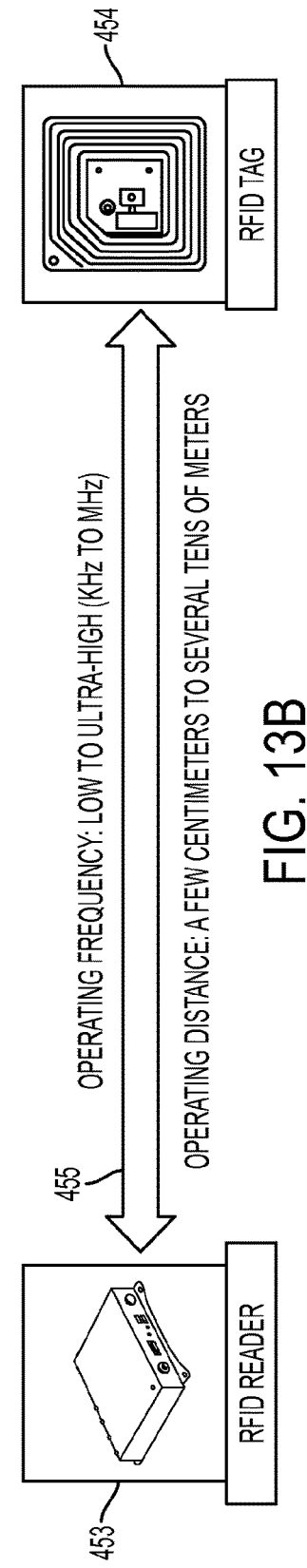
FIG. 13B illustrates an example of an RFID reader, an RFID tag, and the operating distance between the two.

A goal of RSS decay models is to reliably characterize and establish the relationship between the tag's RSS behavior and the tag-reader distance. FIG. 13B illustrates an example of an RFID reader 453, a passive RFID tag 454, and the tag-reader distance 455 (i.e., operating distance).

A tag's RSS behavior is continually changing due to ambient environmental interference, tag-centric variable radio sensitivity, and orientation. The ambient environment's impact can be minimized by ensuring that the operating environment usually remains unchanged. Thus, such ambient noise can be considered statistically invariant when developing RSS decay models that characterize a tag's integral variable radio sensitivity with respect to its axial-radial orientation. Furthermore, knowledge of the reader antenna's radiation pattern 151 (for example, FIG. 4), 552 (for example, FIG. 15) helps in determining its shape, which aids in the development of decay models.

Figure 14:
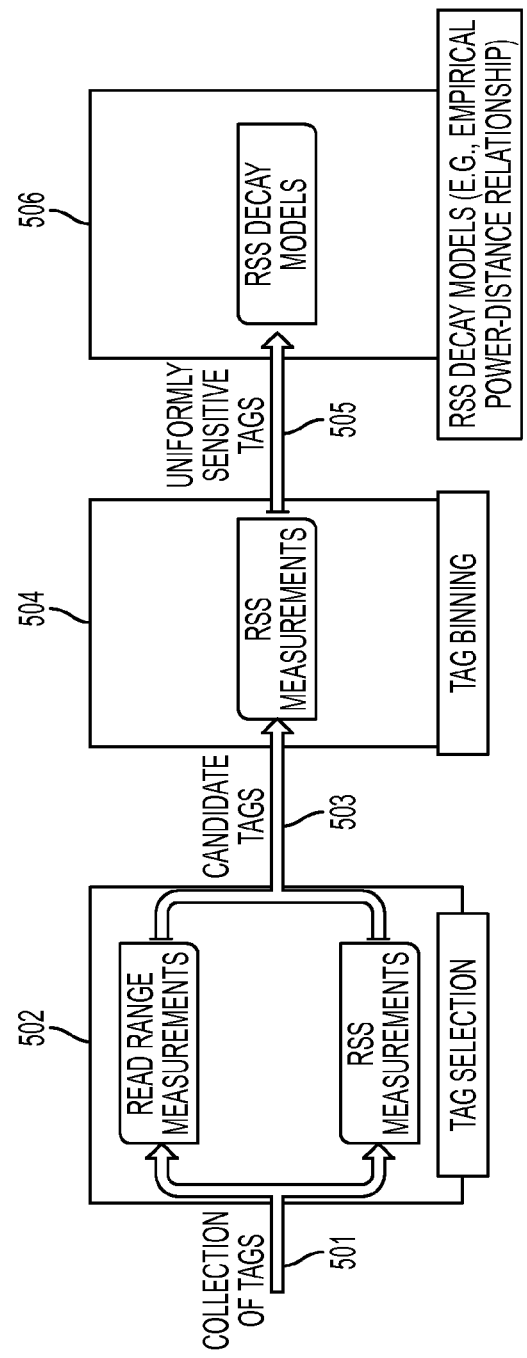
FIG. 14 is a flowchart illustrating an example of a method for selecting optimal tag types, binning uniformly sensitive tags, and developing RSS decay models.

An aspect of an embodiment of the present invention entails developing an RSS decay model for an RFID system. Referring to FIG. 14, The process of developing an RSS decay model 506 can either be on its own or combined with the selection of optimal RFID tags 502, the binning of uniformly performing RFID tags 504, or both to form other embodiments of the present invention. Accordingly, FIG. 14 is a flowchart showing the progression when all three steps are combined.

Figure 4:
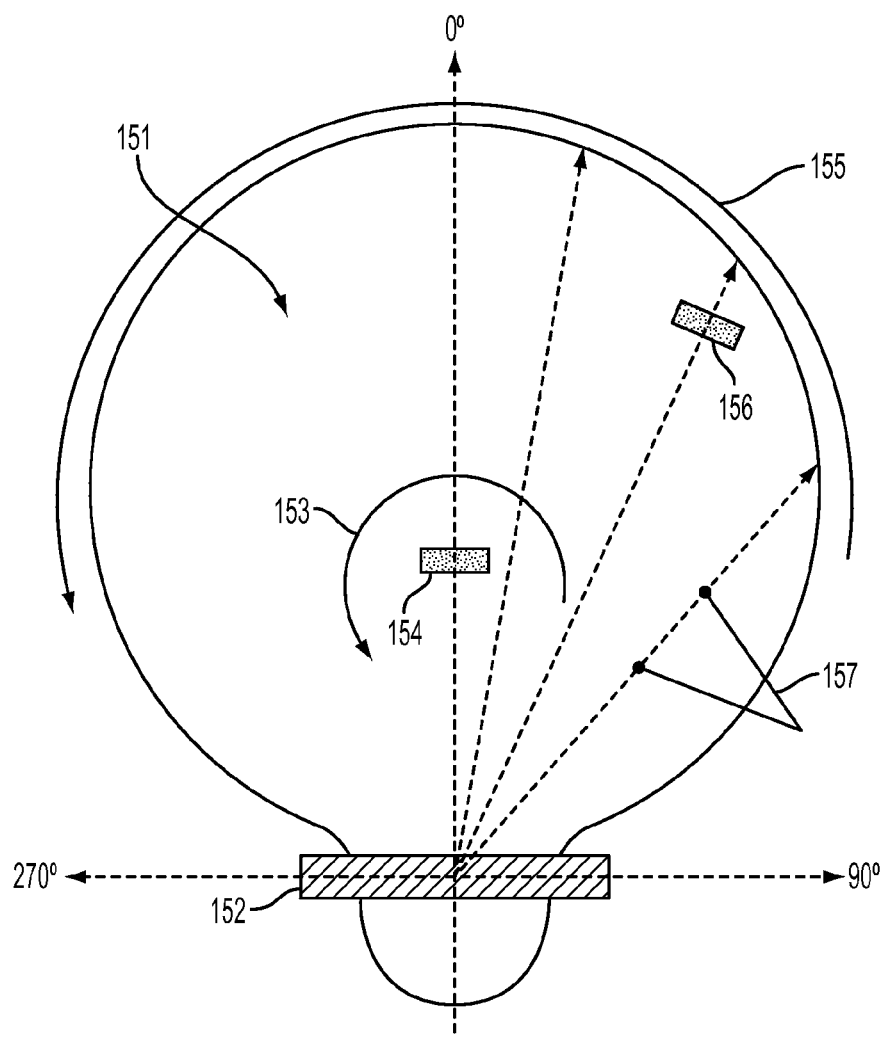
FIG. 4 illustrates an example of a top-down view of an antenna radiation pattern and tag orientation for measuring RSS.

FIG. 4 illustrates an example of a top-down view of a setup for the testing required to develop RSS decay models. An RSS decay model is developed by first measuring RSS of RFID tags 154, 156 at multiple tag-reader distances and orientations 153, 155 (axial, radial) with respect to the RFID reader antenna 152. The tags used can be active, passive, or semi-passive. Furthermore, the tags 154, 156 can be orientated in relation to the reader either axially 153 or radially 155, respectively.

Figure 5:
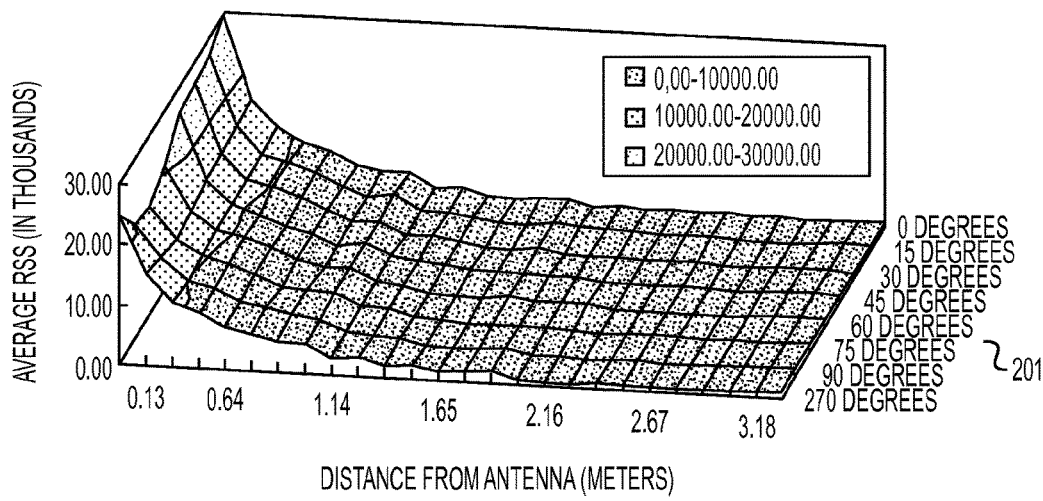
FIG. 5 illustrates an example of average RSS at various tag-reader distances and axial orientations.
Figure 6:
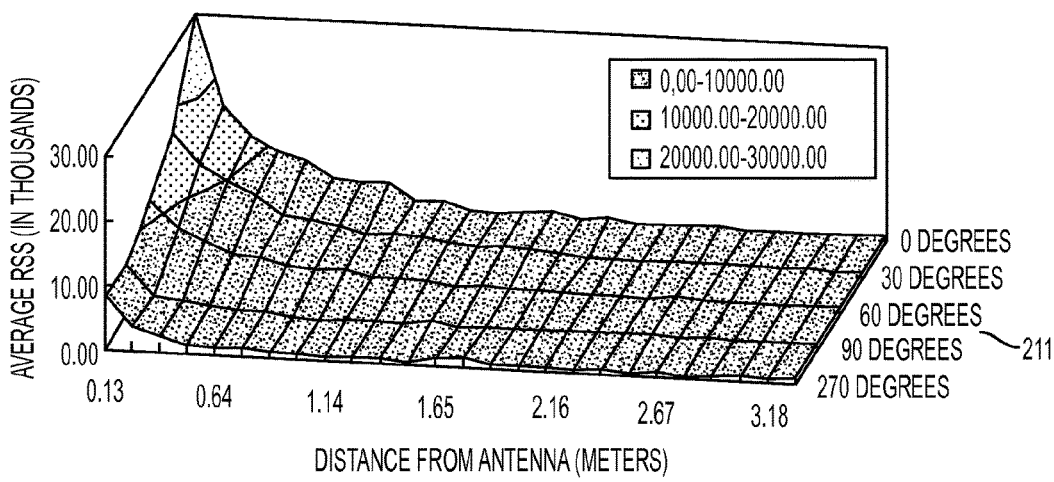
FIG. 6 illustrates an example of average RSS at various tag-reader distances and radial orientations.

Still referring to FIG. 4, the axial orientation 153 involves rotating a tag on its axis to certain predefined angles with respect to the RFID reader antenna 152. Next, FIG. 5 illustrates example results for average RSS across multiple axial orientations 201 (shown on z-axis). In contrast, radial orientation 155 involves placing a tag at certain points along a semicircle that tracks a given distance from the reader. An example of an RSS-distance gradient 157 showing a possible radial orientation of a tag is given in FIG. 4. FIG. 6 illustrates example results for average RSS across multiple radial orientations 211 (shown on z-axis). Different axial 153 and radial 155 orientations can be combined when measuring RSS.

The second step in developing an RSS decay model requires fitting the RSS measurements to an exponential decay formula. An example version of an exponential decay formula has the following general expression format:

$$RSS = C \cdot D^E$$

where RSS, C, D, and E are the received signal strength value returned by the reader, coefficient, tag-reader distance, and the exponent, respectively. Goodness-of-fit measures based on a least-squares fitting paradigm can be used to select the best possible curves that fit the tag orientation specific RSS behavior. $R^2$ and normalized root mean square error (NRMSE) are two examples of goodness-of-fit measures.

An aspect of an embodiment of the present invention can use one of several approaches for fitting the RSS measurements to an exponential decay formula. One approach separates RSS measurements at different axial orientations 153. Another approach separates RSS measurements at different radial orientations 155. A preliminary exponential decay formula may then be created for each orientation. Then, the preliminary exponential decay formulas may be averaged to create a combined exponential decay formula. Alternatively, another approach requires first averaging all RSS measurements, such as those shown in FIGS. 5 and 6, across all axial orientations 153 (for example, FIG. 4) and radial orientations 155 (for example, FIG. 4), at each tag-reader distance 455 (for example, FIG. 13B). The exponential decay formula is created by using the average RSS measurement at each distance.

Figure 15:
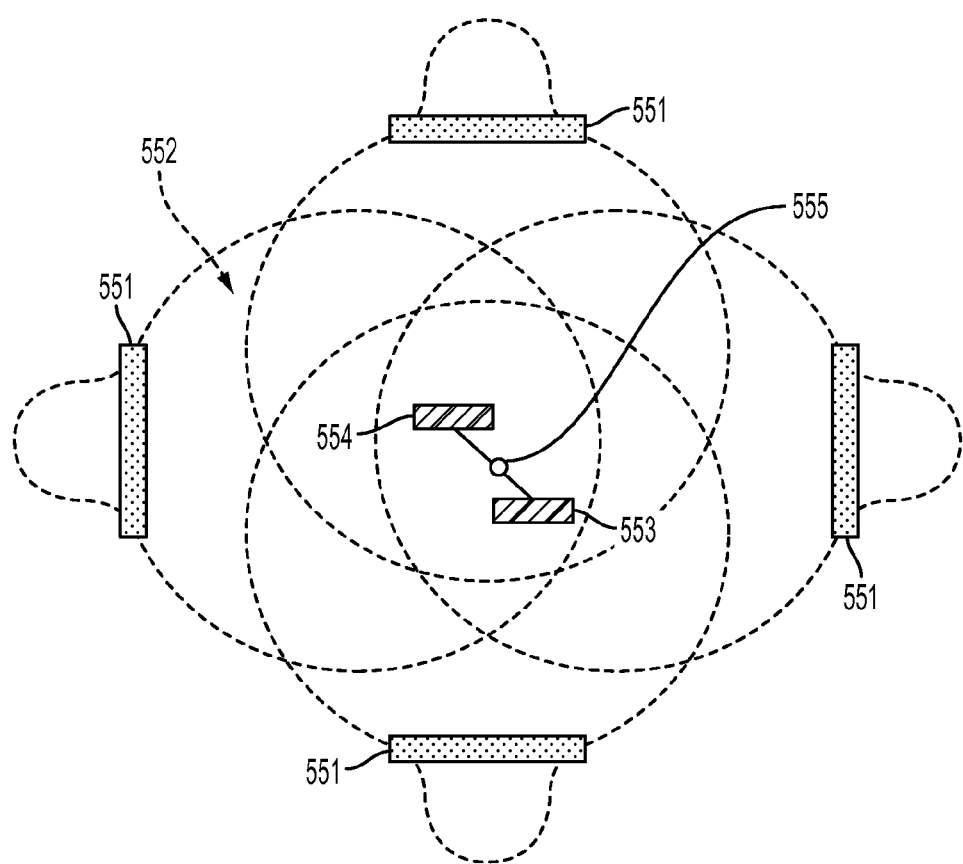
FIG. 15 illustrates an example of a top-down view of a system with multiple RFID readers and one or more reference tags to decrease localization error.

The resulting exponential decay formula serves as the RSS decay model by relating increasing tag-reader distance 455 to decreasing RSS for a given RFID reader-tag system. RSS decay models based on the above characterization tend to provide sustained average-case high object localization performance for different application scenario driven deployments. FIG. 15 illustrates an example top-down view of an RFID system with localization error 555, which is the distance between the location of the reference tag 554 and the location of the target RFID tag 553. The RFID reader 551 uses a decay model 506 to relate the RSS from the target RFID tag 553 with the distance to a known reference tag 554. Localization error 555 can be minimized by using more than one RFID reader 551, among other techniques. For example, FIG. 15 shows four RFID readers 551. Each of the four RFID readers can give a different estimated location of the target RFID tag 553. The four estimates may be averaged together to yield a single estimated location.

Figure 16:
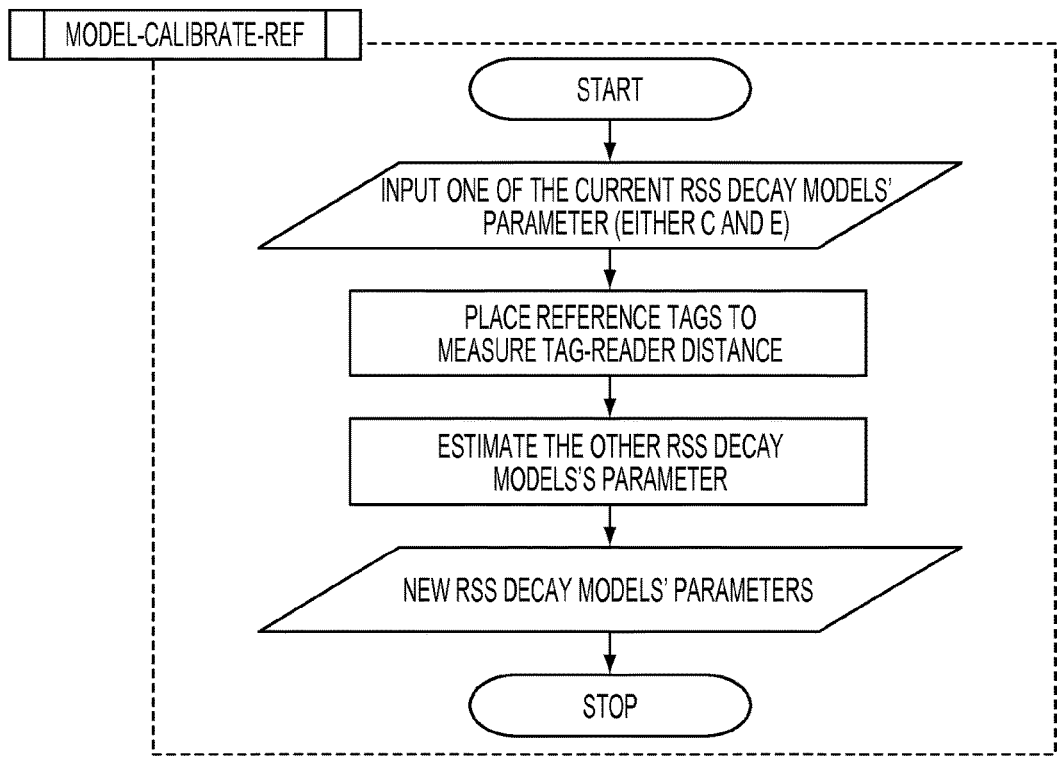
FIG. 16 is a flowchart illustrating an example of a method for using reference tags to calibrate RSS decay models.
Figure 17:
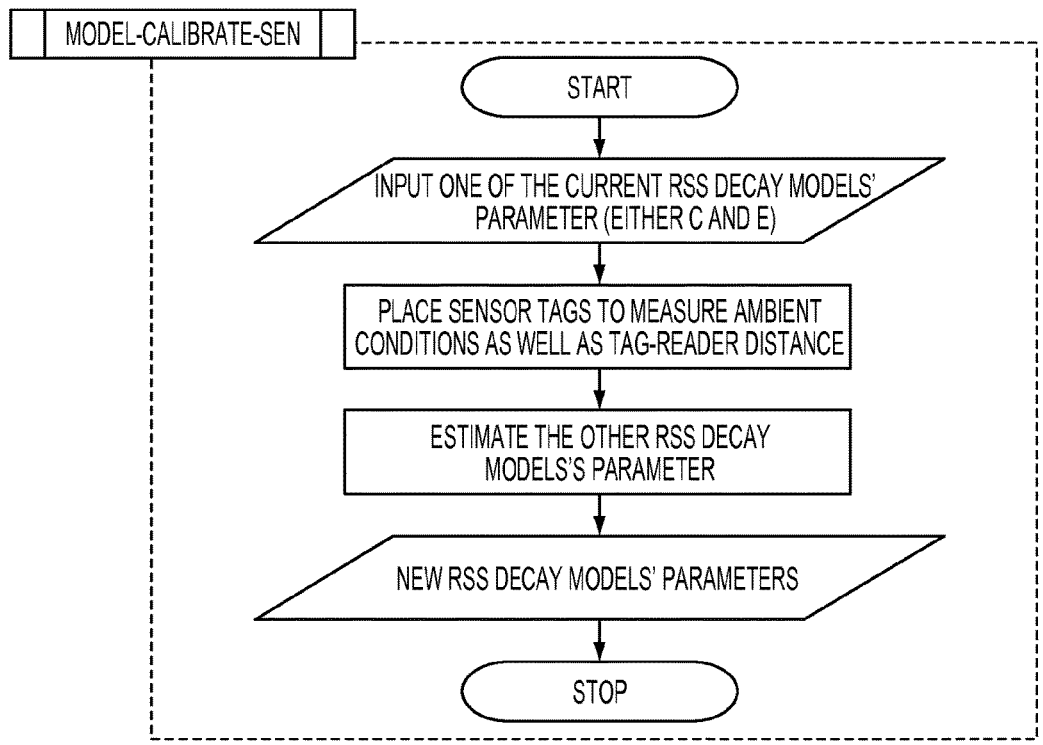
FIG. 17 is a flowchart illustrating an example of a method for using sensor tags to calibrate RSS decay models.

An aspect of an embodiment of the present invention can exhibit some spatio-temporal drifts, which can be mitigated by performing periodic and on-demand in-situ calibration. FIG. 16 is a flowchart 601 showing a process of using uniformly sensitive reference tags 554 (for example, FIG. 15) and k-nearest neighbor algorithms to help calibrate the coefficient and the exponent. Alternatively, FIG. 17 is a flowchart 701 that gives an example of how RSS decay models can dynamically evolve by using sensor tags that measure different ambient conditions such as temperature, pressure, and humidity.

Figure 12:
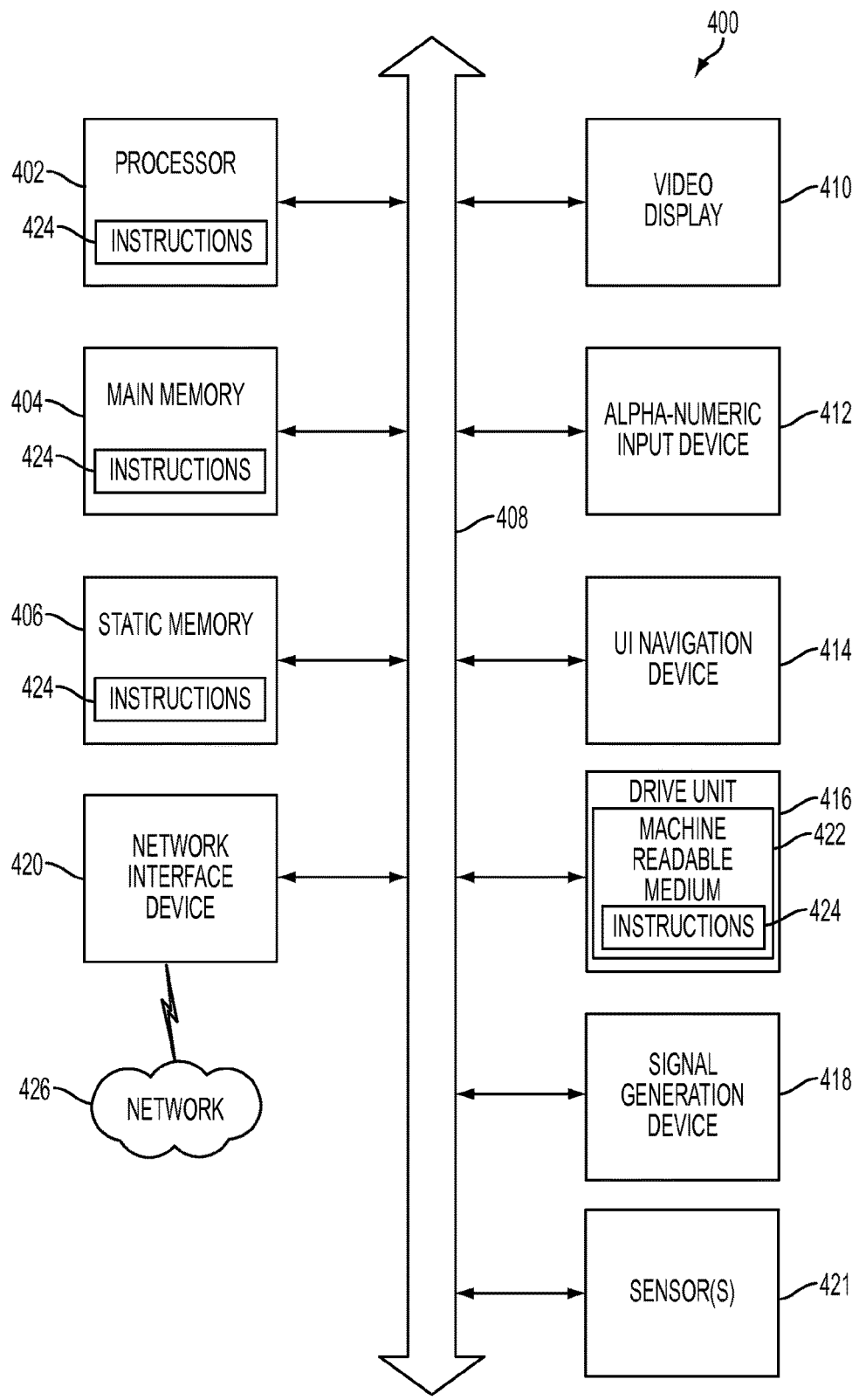
FIG. 12 is a block diagram illustrating an example of a machine upon which one or more aspects of embodiments of the present invention can be implemented.

FIG. 12 illustrates a block diagram of an example machine 400 upon which one or more embodiments (e.g., discussed methodologies) can be implemented (e.g., run).

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).) Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments.

In an example, the machine 400 can operate as a standalone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer (or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term "machine" shall also be taken to include any collection of machines that individually or jointly execute a set (or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 411 (e.g., a mouse). In an example, the display unit 810, input device 417 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

An aspect of an embodiment of the present invention includes a tag testing circuit that measures the RSS of multiple RFID tags of different types from a starting collection of tags 501 (for example, FIG. 14). FIG. 12 illustrates an example of a circuit that could be used as the tag testing circuit. FIGS. 1 and 13A give examples of different types of RFID tags 1-34 and 452, respectively. The tags whose RSS is measured by the tag testing circuit can be either passive, active, semi-passive, or any combination thereof. The RSS is measured at one or more RFID reader power levels and reader-tag distances. FIG. 2 illustrates an example where RSS was measured at 3 power levels and 3 reader-tag distances.

Such aspect of an embodiment of the present invention also includes a tag selection circuit (FIG. 12 illustrates an example) that analyzes the RSS measurements to select the optimal RFID tag type. FIG. 10 illustrates the tag selection process 302 performed by the tag selection circuit. The optimal tag type can be identified by the tag selection circuit on the basis of several different metrics, including least variation between RSS 304 over different power levels, highest correlation between increasing reader-tag distance and decreasing RSS 304, longest read range 305, and highest read count 303 over a given time interval. The tag selection circuit can be configured to select more than one optimal type of RFID tag 306 if so desired.

An aspect of an embodiment of the present invention includes a binning circuit that whittles multiple candidate RFID tags 503 (for example, FIG. 14) of a predetermined optimal RFID tag type down to a uniformly sensitive subset 505 (for example, FIG. 14) that perform closest to average. FIG. 12 illustrates an example of a circuit that could serve as the binning circuit. The binning circuit, which performs the tag binning step 504, may be combined with the circuits required to perform either one or both of the tag selection 502 and decay model development 506 steps to form a system capable of performing a more extensive process, like the one in FIG. 14.

FIG. 11 illustrates an example of the tag binning process 352 performed by the binning circuit. The binning circuit uses RSS 353 or read count 354 measurements of the RFID tags at multiple power levels and tag-reader distances. FIG. 3 illustrates an example of how RSS measurements may be distributed. The dashed vertical lines in FIG. 3 mark the averages at each of the three tag-reader distances—0.61 meters 101, 1.83 meters 102, and 3.05 meters 103—used in the example.

The metric used to define how close a given tag is to average can be either RSS 353 or read count 354 over a given time interval. The number of tags included in the selected subset 357 depends on the number of tags (1–N) started with 351 and the breadth of range selected. The breadth of range can be computed from a predefined number of standard deviations from the mean. Alternatively, a user-defined number of standard deviations can be applied 356. Two standard deviations is an example of possible number that could be used by the binning circuit.

An aspect of an embodiment of the present invention includes an RSS measurement circuit and a calibration circuit. FIG. 12 illustrates an example of a circuit that could serve as either of these two circuits. These circuits can be combined with the circuits required to perform the tag selection 502 and tag binning steps 504 to create a system capable of performing a more extensive process, like the one illustrated in FIG. 14.

FIG. 4 illustrates an example of a top-down view of a setup for testing RFID tags 154, 156 that could be controlled by the RSS measurement circuit. The RSS measurement circuit measures the RSS of multiple RFID tags 154, 156 at multiple tag-reader distances 455. The tags 154, 156 may be tested at multiple axial 153 or radial 155 orientations, respectively, at each distance. FIG. 4 illustrates how tags 154, 156 can be oriented axially 153 and radially 155 with respect to the RFID reader antenna 152. FIG. 5 illustrates example average RSS measurements across multiple axial orientations 201 (shown on z-axis). FIG. 6 illustrates example average RSS measurements across multiple radial orientations 211 (shown on z-axis).

The calibration circuit uses the measurements from the RSS measurement circuit to develop an RSS decay model that relates increasing tag-reader distance 455 to decreasing RSS. The decay model consists of an exponential decay formula, which is formed through a least-squares fitting of the RSS measurements. Two examples of metrics for a least-squares fitting are $R^2$ and normalized root-mean-square error (NRMSE).

An aspect of an embodiment of the present invention includes an RSS measurement circuit and a calibration circuit. FIG. 12 illustrates an example of a circuit that could serve as either or both of these two circuits. The RSS measurement circuit may be configured to measure RSS of one or more RFID tags at a plurality of tag-reader distances and a plurality of orientations with respect to the RFID reader. FIG. 13B illustrates an example tag-reader distance 455, which is the distance between an RFID reader and an RFID tag. FIG. 4 shows how tags can be oriented both axially 153 and radially 155. The calibration circuit may be configured to fit the RSS measurements to an exponential decay formula to provide an RSS decay model. The exponential decay formula relates increasing tag-reader distance to decreasing RSS.

An aspect of an embodiment of the present invention is computer software or executable instructions that, when executed by a machine, causes the machine to perform multiple steps. FIG. 12 illustrates an example of a circuit that could execute the computer software, understood more technically as a machine readable medium 922 that includes instructions 924.

First, it measures the RSS of multiple RFID tags 301 of different types. FIGS. 1 and 13A illustrate examples of different types of RFID tags. The measurements can be performed at different power levels and tag-reader distances. FIG. 2 illustrates an example of RSS measurements at 3 power levels and 3 tag-reader distances. Second, it selects one or more optimal RFID tag types 306 through an analysis of the measured RSS of the RFID tags. The optimal tag types can be selected on the basis of longest read range 305, highest read count 303, or uniform RSS performance 304.

Third, it measures the RSS of multiple RFID tags 351 of the optimal RFID tag type. The measurements can be performed at multiple power levels and tag-reader distances. FIG. 3 illustrates an example of RSS measurements at 3 power levels and 3 tag-reader distances. Fourth, it identifies a subset of the RFID tags, represented by the refined same tag type collections 1 357 through K 359 in FIG. 11, of the optimal type that perform closest to average on a particular metric, such as RSS 353 or read count 354. FIG. 3 includes RSS averages 101-103 at each tag-reader distance marked by a dashed line.

Fifth, it measures the RSS of the remaining RFID tags 505 at multiple tag-reader distances. FIG. 4 illustrates an example testing setup of RFID tags 154, 156 and reader antennas 152. The RSS may be measured at multiple axial 153 and radial 155 orientations with respect to the RFID reader antenna 152. Sixth, it fits the RSS measurements at multiple tag-reader distances to an RSS decay model that relates increasing tag-reader distance to decreasing RSS.

An aspect of an embodiment of the present invention provides, but not limited thereto, an RFID-based robust RSS decay model-driven real-time location system (and related method and computer readable medium) that can accurately locate multiple stationary and mobile objects in a 3D space. Its localization performance results compare favorably with other state-of-the-art RFID-based localization systems. This dispels a common misconception, by showing that RSS can indeed be used as a reliable metric for object localization (among other possible applications), by considering select deployment scenarios, the tag's radio sensitivity, orientation, and its pairing with and distance from the reader.

While an aspect of an embodiment of the present invention need not use any reference tags, the utility and economics of their deployment could be investigated, with the goal of further improving the localization performance; as such, deploying reference tags to further improve the localization performance may be employed within the context of the invention. FIG. 15 illustrates an example of an RFID system that uses reference tags 554 to improve localization performance.

Different combinations of RFID hardware, RSS decay models, automatic calibration procedures, and the economics of scalability could also be investigated; as such, available methods for combining different RFID hardware, RSS decay models, automatic calibration procedures, and the economics of scalability are also considered part of the present invention. Combining and utilizing different RFID hardware, RSS decay models, automatic calibration procedures, and the economics of scalability are also considered part of the present invention and may be employed within the context of the invention. FIGS. 16 and 17 illustrate examples of using reference tags and sensor tags respectively to calibrate RSS decay models.

Finally, the efficacy of robust RSS could be studied in applications beyond object localization; as such, available methods for utilizing robust RSS in applications beyond object localization are also considered part of the present invention. Implementing and practicing robust RSS in applications beyond object localization are considered part of the present invention and may be employed within the context of the invention.

EXAMPLES

Practice of an aspect of an embodiment (or embodiments) of the invention will be still more fully understood from the following examples and experimental results, which are presented herein for illustration only and should not be construed as limiting the invention in any way.

Example and Experimental Results Set No. 1

To develop robust RSS decay models to be used in the proposed RFID-based real-time location system, empirical tag-reader interaction data was collected in a realistic environment having a variety of noise sources, such as servo motors, WiFi access points, and metal-liquid containers. Alien ALR-9900+ and ThingMagic Mercury6 readers and Electronic Product Code (EPC) Generation 2 (Gen2) passive tags operating in the ultra-high frequency (UHF) band were used for demonstrating the capabilities of the proposed system.

FIG. 1 illustrates the collection of tag types (with overlaid tag type IDs, 1-34) used in the tag selection experiments. Two sets of experiments using the ThingMagic and Alien readers were performed to select the most effective tags. In the first experiment, the longest tag read distance was measured for each tag in the collection. Tag type IDs {2-4, 8-14, 16-23, 26-29, 31-34} and {2-4, 8-10, 13, 14, 16, 19, 20, 22, 23, 26-29, 33, 34} were readable at the maximum read distance of 9 meters by the ThingMagic and the Alien reader, respectively.

In the second experiment, the tags' RSS behavior was measured over tag-reader distance and reader output power level combinations using both readers for the tags that demonstrated the longest read ranges in the previous experiment. To balance the experimental coverage and efficiency, the distance was varied among the set {0.61, 1.83, 3.05} meters while the reader output power level iterated over the {19.6, 25.6, 31.6} dBm levels. FIG. 2 presents the average RSS behavior distribution of the selected tags for different power-distance combinations on the Alien reader.

Note that the RSS values returned by the ThingMagic and the Alien readers are in dBm units and unitless, respectively. Among the tag types having the longest read ranges, Tag-10 and Tag-14 were the only tags that showed consistent RSS behavior over the power-distance combination. For example, Tag-10 and Tag-14 were the only tags that consistently showed RSS activity when kept at a distance of 1.83 meters from the readers operating at an output power level of 19.6 dBm. FIG. 2 shows an RSS reading 51 for Tag-14 at that distance and power level combination. The leftover tags either did not have long read ranges and/or did not exhibit uniform RSS behavior over the power-distance combinations.

By combining results from both the experiments, it was evident that Tag-10 and Tag-14 were the best candidate tags for the ThingMagic and the Alien reader, respectively. While only one candidate tag per reader was found to be performing optimally in these experiments, it is also possible to identify a larger set of candidate tags per reader. After selecting the candidate tags, the group RSS behavior of both of the tag types (i.e. Tag-10 and Tag-14) was separately characterized. To identify a uniformly sensitive set of tags from a large group of a given tag type, their RSS behavior was observed over a range of tag-reader distances and reader output power level combinations. The distribution's central tendency was then measured. Next, the tags of each type were sorted (or binned) based on their RSS behavior. FIG. 3 illustrates the binning distribution of 500 tags of the Tag-14 type using the Alien reader.

For the tag binning experiment, reader output power level was varied over the values {19.6, 25.6, 31.6} dBm while tag-reader distance was gradually increased over the distances {0.61, 1.83, 3.05} meters. The intervals used in these sets of experiments were kept consistent with the previous experiments to derive correlated inferences. A tag binning distribution is a collection of distance measurement point-based Gaussian distributions. Table I illustrates the mean ($\mu$) and the standard deviation ($\sigma$) for the [Tag-10, ThingMagic] and the [Tag-14, Alien] tag-reader pairs, at tag-reader distances of 0.61, 1.83, and 3.05 meters.

The mean and standard deviation for the [Tag-14, Alien] tag-reader pair is also shown in FIG. 3 using dotted lines for 0.61 meters 101, 1.83 meters 102, and 3.05 meters 103. For selecting the uniformly sensitive tags, a $2\sigma$ filtering window was used about the mean for each tag binning distribution. For example, considering the Alien reader and the Tag-14 type, the filtering window at 0.61 meters was 545.48 about the mean, thus allowing Tag-14 type tags to be selected from the RSS interval[4531.36, 5622.32]. The filtering window can be suitably adjusted to arrive at application-specific tradeoffs between the number of tags available and the quality of their RSS behavior (e.g. relaxing the filtering window to $4\sigma$ selects more tags having less uniform RSS behavior, while restricting the filtering window to $1\sigma$ selects fewer tags having more uniform RSS behavior).

By counting the tags present within the filtering window at each of the power-distance combinations and eliminating the duplicates, 66% of the tags (i.e. 330 out of 500) of type Tag-10 and 73.8% of the tags (i.e. 369 out of 500) of type Tag-14 were identified as uniformly sensitive for the ThingMagic and the Alien reader, respectively. All the subsequent experiments were based with these selected uniformly sensitive tags.

In the development of some embodiments of the RSS decay models, the reader output power level was initially kept constant at 31.6 dBm and while the tag-reader distance was varied over the range [0, 3.30] meters in steps of 0.127 meters. Each tag was rotated on its axis and around the reader's antenna over the interval[0°, 90°] in steps of 15° (for axial measurements) and 30° (for radial measurements), respectively. Each tag's RSS was also measured at 270° to ensure efficient coverage of the reader antenna's radiation pattern. FIGS. 5 and 6 show Tag-14 axial-radial orientation based RSS behavior for the Alien reader. Peak RSS behavior shown in FIG. 6 for the Alien reader is due to the combination of the reader antenna's radiation pattern and the tag's orientation-dependent antenna response.

A next step was to take the gathered RSS measurements and develop RSS decay models based off of them. Table II illustrates the average RSS decay models for both the tag-reader pairs.

TABLE I

GROUP RSS BEHAVIOR OF CANDIDATE TAG TYPES.
Mean and Standard Deviation of the Selected Tag-Reader Pairs

| Tag-Reader Pairs | ($\mu_{0.61}$, $\sigma_{0.61}$) | ($\mu_{1.83}$, $\sigma_{1.83}$) | ($\mu_{3.05}$, $\sigma_{3.05}$) |
|---|---|---|---|
| [Tag-10, ThingMagic] | (−59.02, 0.56) | (−68.22, 3.46) | (−70.99, 2.68) |
| [Tag-14, Alien] | (5076.84, 272.74) | (1256.37, 316.01) | (1109.97, 161.01) |

TABLE II

GROUP RSS BEHAVIOR OF CANDIDATE TAG TYPES.

| Degrees | Coefficient (C) | Exponent (E) | $R^2 \in$ [0.1] | NRMSE $\in$ [0, 1] |
|---|---|---|---|---|
| Average RSS Decay Model for the [Tag-10, ThingMagic] Tag-Reader Pair | | | | |
| 0-270° | −53.17 | 0.29 | 0.91 | 0.07 |
| Average RSS Decay Model for the [Tag-14, Alien] Tag-Reader Pair | | | | |
| 0-270° | 3246.76 | −0.89 | 0.96 | 0.04 |

Example and Experimental Results Set No. 2

Figure 7:
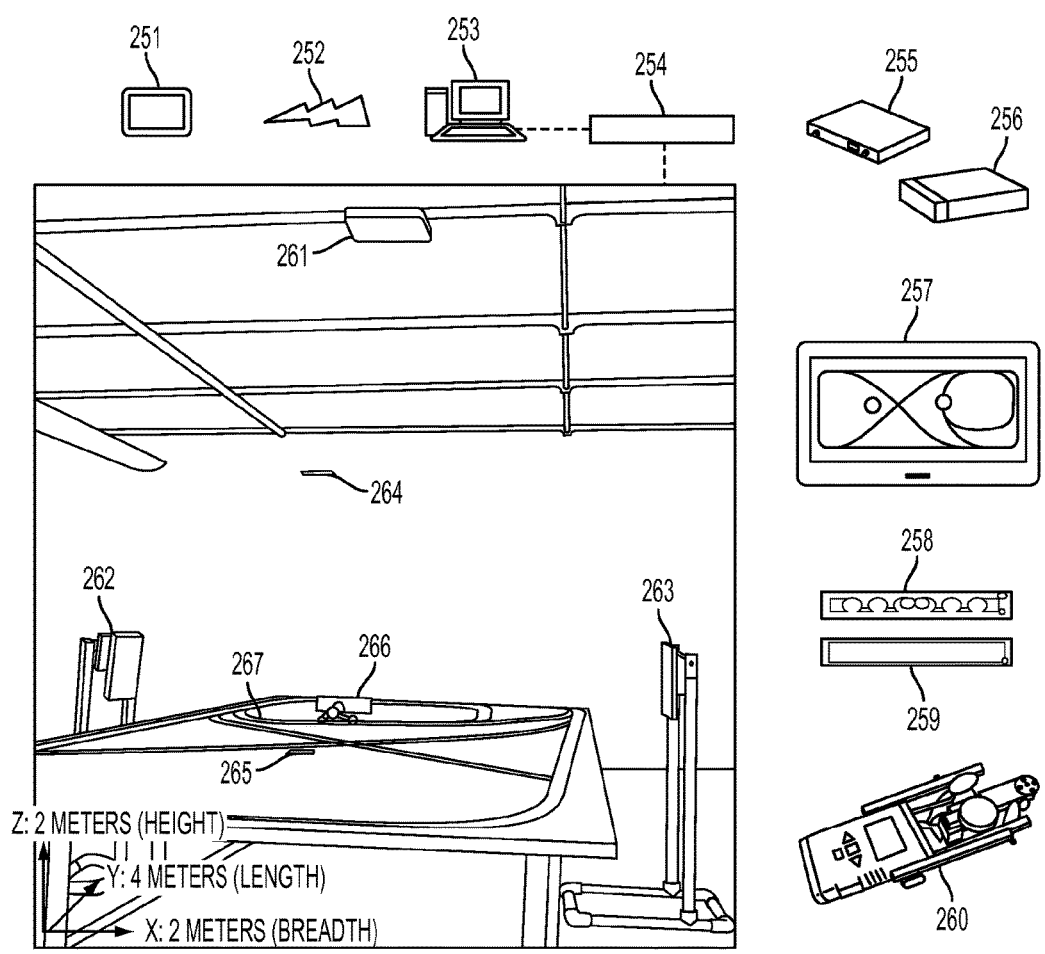
FIG. 7 illustrates an example of an experimental lab setup for testing an RSS decay model.

To experimentally evaluate an aspect of an embodiment of the present invention, a realistically noisy environment having 16 cubic-meters volume was set up. FIG. 7 illustrates the experimental setup. A Lego Mindstorms based track driven robot system 260 (or other mobile robot or robot system) was developed to wirelessly control and move the target tags 266. RFID readers 255, 256 (such as ThingMagic or Alien brands or other brands as desired or required) equipped with three antennas 261, 262, 263 were connected to a host computer or PC 253 (with an AMD Athlon 64 processor running at 2 GHz with 1 GB RAM). The real-time RSS values reported by each reader 254 were routed to the host 253 running the models for locating the target objects. For visualization purposes, the real-time position estimates were transmitted through WiFi 252 to modern tablet computers 251 (an iPad and a Samsung Galaxy), which displayed a user interface (UI) 257 modeling the position of the RFID tags and readers. The mobile robots 260 moved along the track 267 at speeds of up to 0.2 meters/second.

Figure 8:
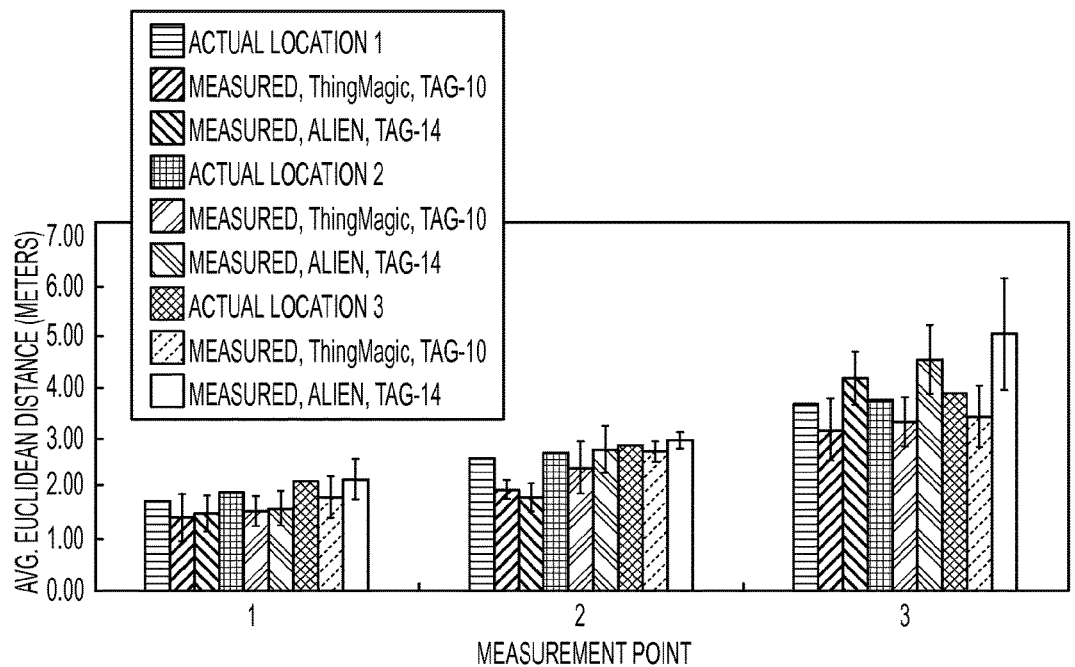
FIG. 8 illustrates an example of experimental results from stationary object localization accuracy tests.
Figure 9:
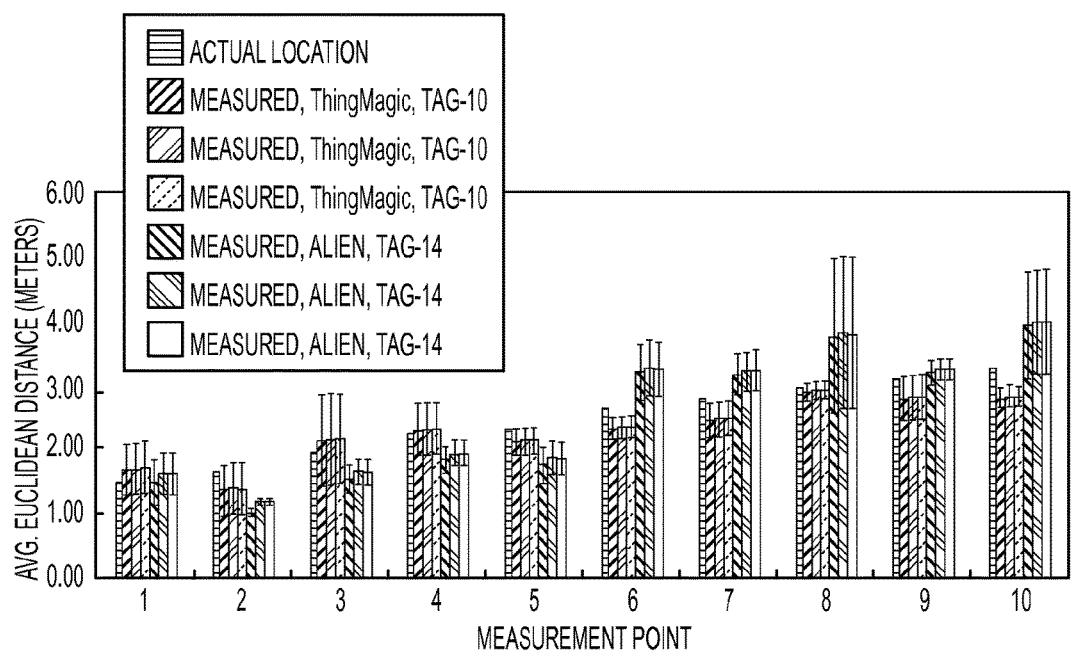
FIG. 9 illustrates an example of experimental results from mobile object localization accuracy tests.

Still referring to FIG. 7, several stationary 264, 265 (i.e., tags) and mobile objects 266 (i.e., tags) were simultaneously located in 3D space by placing three objects at several locations while adjusting their heights to three levels. Tag-10 258 and Tag-14 259 were the two types of tags tested. FIG. 8 depicts the actual and measured average Euclidean distance for the stationary objects 264, 265 from a reference origin using the two tag-reader pairs. FIG. 9 depicts the same for mobile objects 266 (i.e. tags). The measured average Euclidean distances closely tracked the corresponding actual distances of the target objects.

However, there were a few locations where the localization accuracy variation was slightly larger than the overall localization accuracy distribution (e.g. measurement point 3 in FIG. 8 and measurement points 8 and 10 in FIG. 9). Such variations were due to the reader antenna's radiation lobe pattern, which caused some measurement points to be located in radio "blind spots". This phenomenon can be mitigated by using additional antennas with overlapping detection regions.

The combined 3D stationary and mobile object localization accuracy for the [Tag-10, ThingMagic] and the [Tag-14, Alien] tag-reader pairs fits in the interval[0.3, 1.21] and [0, 1.14] meters, respectively. Furthermore, the overall average 3D object localization accuracy for both the tag-reader pairs was determined to be 0.6 meters. Considering that the above results were obtained without using any reference tags, the overall object localization performance of an aspect of an embodiment of the present invention can be further improved. The above localization experiments were conducted over a six month period to ensure consistency amidst ambient interference.

ADDITIONAL EXAMPLES

Example 1

An aspect of an embodiment of the present invention provides, among other things, a method of selecting a type of radio-frequency identification (RFID) tag. The method may comprise: providing a plurality of RFID tags, wherein the plurality of RFID tags is comprised of at least two different RFID tag types; measuring the received signal strength (RSS) of the plurality of RFID tags for at least one RFID reader power level and at least one reader-tag distance, wherein the reader-tag distance is the distance between an RFID reader and an RFID tag; and analyzing the measured RSS of the plurality of RFID tags to select the optimal RFID tag type.

Example 2

The method of example 1, wherein the analyzing includes determining which of the different RFID tag types has the least variation between measured RSS over the different RFID reader power levels.

Example 3

The method of example 1, wherein the analyzing includes determining which of the different RFID tag types has the highest correlation between increases in reader-tag distance and decreases in measured RSS.

Example 4

The method of example 1, wherein the analyzing includes determining which of the different types of RFID tag has the longest read range.

Example 5

The method of example 1, wherein the analyzing includes determining which of the different types of RFID tag has the highest read count.

Example 6

The method of example 1, wherein the plurality of RFID tags are passive.

Example 7

The method of example 1, wherein the plurality of RFID tags are active.

Example 8

The method of examples 1, wherein the plurality of RFID tags are semi-passive.

Example 9

The method of example 1, wherein the plurality of RFID tags are at least one of passive, active, semi-passive, or any combination thereof.

Example 10

The method of example 1, wherein the analyzing comprises selecting two or more optimal RFID tag types.

Example 11

The method of example 1, further comprising:
identifying a subset of RFID tags of the at least one optimal RFID tag type that perform closest to the mean on a particular metric.

Example 12

The method of example 11, wherein the particular metric is measured RSS.

Example 13

The method of example 11, wherein the particular metric is measured read-count.

Example 14

The method of example 12, wherein the subset of RFID tags are the RFID tags that have measured RSS within a predetermined number of standard deviations from the mean.

Example 15

The method of example 12, wherein the subset of RFID tags are the RFID tags that have measured RSS within a user-defined number of standard deviations from the mean.

Example 16

The method of example 15, wherein the user-defined number of standard deviations comprises two standard deviations from the mean.

Example 17

The method of example 11, further comprising:
developing an RSS decay model that relates increasing tag-reader distance to decreasing RSS, using the measured RSS of the subset of RFID tags at a plurality of tag-reader distances.

Example 18

The method of example 17, wherein the RSS decay model is an exponential decay formula created with a least-squares fitting.

Example 19

The method of example 18, wherein goodness of the fit of the least-squares fitting is determined using an $R^2$ metric.

Example 20

The method of example 18, wherein goodness of the fit of the least-squares fitting is determined using a normalized root-mean-square error (NRMSE) metric.

Example 21

The method of example 17, wherein the exponential decay formula is:

$$RSS = C*D^E$$

wherein:
C is a coefficient,
D is a tag-reader distance, and
E is an exponent.

Example 22

The method of example 17, wherein the RSS of the subset of RFID tags is also measured at a plurality of tag orientations with respect to the RFID reader.

Example 23

The method of example 22, wherein the plurality of tag orientations are axial, radial, or both.

Example 24

The method of example 1, further comprising:
developing an RSS decay model that relates increasing tag-reader distance to decreasing RSS, using the measured RSS of one or more RFID tags of the optimal RFID tag type at a plurality of tag-reader distances.

Example 25

The method of example 24, wherein the RSS decay model is an exponential decay formula created with a least-squares fitting.

Example 26

The method of example 25, wherein goodness of the fit of the least-squares fitting is determined using an $R^2$ metric.

Example 27

The method of example 25, wherein goodness of the fit of the least-squares fitting is determined using a normalized root-mean-square error (NRMSE) metric.

Example 28

The method of example 24, wherein the exponential decay formula is:

$$RSS = C*D^E$$

wherein:
C is a coefficient,
D is a tag-reader distance, and
E is an exponent.

Example 29

The method of example 24, wherein the RSS is also measured at a plurality of tag orientations with respect to the RFID reader.

Example 30

The method of example 29, wherein the plurality of tag orientations are axial, radial, or both.

Example 31

An aspect of an embodiment of the present invention provides, among other things, a method of developing a received signal strength (RSS) decay model for a radio-frequency identification (RFID) system. The method may comprise: measuring RSS of one or more RFID tags at a plurality of tag-reader distances and a plurality of orientations with respect to the RFID reader, wherein the tag-reader distance is the distance between an RFID reader and an RFID tag; and fitting the RSS measurements to an exponential decay formula to provide the RSS decay model, wherein the exponential decay formula relates increasing tag-reader distance to decreasing RSS.

Example 32

The method of example 31, wherein the one or more RFID tags measured are passive.

Example 33

The method of example 31, wherein the one or more RFID tags measured are active.

Example 34

The method of example 31, wherein the one or more RFID tags measured are semi-passive.

Example 35

The method of example 31, wherein the fitting is a least-squares fitting.

Example 36

The method of example 35, wherein goodness of the fit of the least-squares fitting is determined using an $R^2$ metric.

Example 37

The method of example 35, wherein goodness of the fit of the least-squares fitting is determined using a normalized root-mean-square error (NRMSE) metric.

Example 38

The method of example 31, wherein the exponential decay formula is:

$$RSS = C * D^E$$

wherein:
  C is a coefficient,
  D is a tag-reader distance, and
  E is an exponent.

Example 39

The method of example 31, wherein the orientation of the one or more RFID tags is axial.

Example 40

The method of example 31, wherein the orientation of the one or more RFID tags is radial.

Example 41

The method of example 31, wherein the orientation of the one or more RFID tags is axial and radial.

Example 42

The method of example 31, wherein the fitting separates RSS measurements at different orientations, creates a preliminary decay model for each orientation, and averages the preliminary decay models to create the RSS decay model.

Example 43

The method of example 31, wherein the fitting of the RSS measurements comprises averaging all RSS measurements at each tag-reader distance and creating the RSS decay model using the average RSS measurements.

Example 44

An aspect of an embodiment of the present invention provides, among other things, a system that may comprise: a tag testing circuit configured to measure the received signal strength (RSS) of a plurality of RFID tags for at least one RFID reader power level and at least one reader-tag distance, wherein the plurality of RFID tags is comprised of at least two different RFID tag types; and a tag selection circuit configured to analyze the measured RSS of the plurality of RFID tags to select the optimal RFID tag type.

Example 45

The system of example 44, wherein the tag selection circuit is configured to determine which of the different RFID tag types has the least variation between measured RSS over the different RFID reader power levels.

Example 46

The system of example 44, wherein the tag selection circuit is configured to determine which of the different RFID tag types has the highest correlation between increases in reader-tag distance and decreases in measured RSS.

Example 47

The system of example 44, wherein the tag selection circuit is configured to determine which of the different types of RFID tag has the longest read range.

Example 48

The system of example 44, wherein the tag selection circuit is configured to determine which of the different types of RFID tag has the highest read count.

Example 49

The system of example 44, wherein the plurality of RFID tags are passive.

Example 50

The system of example 44, wherein the plurality of RFID tags are active.

Example 51

The system of examples 44, wherein the plurality of RFID tags are semi-passive.

Example 52

The system of example 44, wherein the plurality of RFID tags are at least one of passive, active, semi-passive, or any combination thereof.

Example 53

The system of example 44, wherein the tag selection circuit is configured to select two or more optimal RFID tag types.

Example 54

The system of example 44, further comprising:
a binning circuit configured to identify a subset of RFID tags of the optimal RFID tag type that perform closest to the mean on a particular metric.

Example 55

The system of example 54, wherein the particular metric is measured RSS.

Example 56

The system of example 54, wherein the particular metric is measured read-count.

Example 57

The system of example 55, wherein the subset of RFID tags are the RFID tags that have measured RSS within a predetermined number of standard deviations from the mean.

Example 58

The system of example 55, wherein the subset of RFID tags are the RFID tags that have measured RSS within a user-defined number of standard deviations from the mean.

Example 59

The system of example 55, wherein the user-defined number of standard deviations comprises two standard deviations from the mean.

Example 60

The system of example 54, further comprising:
an RSS measurement circuit configured to measure the RSS of the subset of RFID tags at a plurality of tag-reader distances; and
a calibration circuit configured to develop an RSS decay model that relates increasing tag-reader distance to decreasing RSS, using the measurements from the RSS measurement circuit.

Example 61

The system of example 60, wherein the RSS decay model is an exponential decay formula developed through a least-squares fitting.

Example 62

The system of example 61, wherein goodness of the fit of the least-squares fitting is determined using an $R^2$ metric.

Example 63

The system of example 61, wherein goodness of the fit of the least-squares fitting is determined using a normalized root-mean-square error (NRMSE) metric.

Example 64

The system of example 61, wherein the exponential decay formula is:

$$RSS = C * D^E$$

wherein:
C is a coefficient,
D is a tag-reader distance, and
E is an exponent.

Example 65

The system of example 60, wherein the RSS measurement circuit is configured to measure the RSS of the subset of RFID tags at a plurality of tag orientations with respect to the RFID reader.

Example 66

The system of example 65, wherein the plurality of tag orientations are axial, radial, or both.

Example 67

The system of example 44, further comprising:
an RSS measurement circuit configured to measure the RSS of the subset of RFID tags at a plurality of tag-reader distances; and a calibration circuit configured to develop an RSS decay model that relates increasing tag-reader distance to decreasing RSS, using the measurements from the RSS measurement circuit.

Example 68

The system of example 67, wherein the RSS decay model is an exponential decay formula created with a least-squares fitting.

Example 69

The system of example 68, wherein goodness of the fit of the least-squares fitting is determined using an $R^2$ metric.

Example 70

The system of example 68, wherein goodness of the fit of the least-squares fitting is determined using a normalized root-mean-square error (NRMSE) metric.

Example 71

The system of example 67, wherein the exponential decay formula is:

$$RSS = C * D^E$$

wherein:
C is a coefficient,
D is a tag-reader distance, and
E is an exponent.

Example 72

The system of example 67, wherein the RSS is also measured at a plurality of tag orientations with respect to the RFID reader.

Example 73

The system of example 72, wherein the plurality of tag orientations are axial, radial, or both.

Example 74

An aspect of an embodiment of the present invention provides, among other things, a system that may comprise:

an RSS measurement circuit configured to measure the RSS of one or more RFID tags at a plurality of tag-reader distances and a plurality of orientations with respect to the RFID reader, wherein the tag-reader distance is the distance between an RFID reader and an RFID tag; and a calibration circuit configured to fit the RSS measurements to an exponential decay formula to provide an RSS decay model, wherein the exponential decay formula relates increasing tag-reader distance to decreasing RSS.

Example 75

The system of example 74, wherein the one or more RFID tags are passive.

Example 76

The system of example 74, wherein the one or more RFID tags are active.

Example 77

The system of example 74, wherein the one or more RFID tags are semi-passive.

Example 78

The system of example 74, wherein the fitting is a least-squares fitting.

Example 79

The system of example 78, wherein goodness of the fit of the least-squares fitting is determined using an $R^2$ metric.

Example 80

The system of example 78, wherein goodness of the fit of the least-squares fitting is determined using a normalized root-mean-square error (NRMSE) metric.

Example 81

The system of example 74, wherein the exponential decay formula is:
$$RSS = C * D^E$$
wherein:
C is a coefficient,
D is a tag-reader distance, and
E is an exponent.

Example 82

The system of example 74, wherein the orientation of the one or more RFID tags is axial.

Example 83

The system of example 74, wherein the orientation of the one or more RFID tags is radial.

Example 84

The system of example 74, wherein the orientation of the one or more RFID tags is axial and radial.

Example 85

The system of example 74, wherein the fitting separates RSS measurements at different orientations, creates a preliminary decay model for each orientation, and averages the preliminary decay models to create the RSS decay model.

Example 86

The system of example 74, wherein the fitting comprises averaging all RSS measurements at each tag-reader distance and creating the RSS decay model using the average RSS measurements.

Example 87

An aspect of an embodiment of the present invention provides, among other things, a non-transitory machine-readable medium, including instructions, which when executed by a machine, cause the machine to: measure the received signal strength (RSS) of a provided plurality of RFID tags for at least one RFID reader power level and at least one reader-tag distance, wherein the plurality of RFID tags is comprised of at least two different RFID tag types, and wherein the reader-tag distance is the distance between an RFID reader and an RFID tag; and analyze the measured RSS of the plurality of RFID tags to select the optimal RFID tag type.

Example 88

The non-transitory machine-readable medium of example 87, which when executed by the machine, further cause the machine to:
identify a subset of RFID tags of the at least one optimal RFID tag type that perform closest to the mean on a particular metric.

Example 89

The non-transitory machine-readable medium of example 88, which when executed by the machine, further cause the machine to:
develop an RSS decay model that relates increasing tag-reader distance to decreasing RSS, using the measured RSS of the subset of RFID tags at a plurality of tag-reader distances.

Example 90

The non-transitory machine-readable medium of example 87, which when executed by the machine, further cause the machine to:
develop an RSS decay model that relates increasing tag-reader distance to decreasing RSS, using the measured RSS of one or more RFID tags of the optimal RFID tag type at a plurality of tag-reader distances.

Example 91

An aspect of an embodiment of the present invention provides, among other things, a non-transitory machine-readable medium, including instructions, which when executed by a machine, cause the machine to: measure RSS of one or more RFID tags at a plurality of tag-reader distances and a plurality of orientations with respect to the RFID reader, wherein the tag-reader distance is the distance between an RFID reader and an RFID tag; and fit the RSS measurements to an exponential decay formula to provide an RSS decay model, wherein the exponential decay formula relates increasing tag-reader distance to decreasing RSS.

Example 92

An aspect of an embodiment of the present invention provides, among other things, a non-transitory machine-readable medium, including instructions, which when executed by a machine, cause the machine to: measure the received signal strength (RSS) of a plurality of radio frequency identification (RFID) tags of at least two different types; select the optimal RFID tag type by analyzing the measured RSS of the plurality of RFID tags; measure the RSS of a plurality of RFID tags of the optimal RFID tag type; identify a subset of RFID tags of the plurality of RFID tags of the optimal RFID tag type that perform closest to the mean on a particular metric; measure the RSS of the subset of RFID tags at a plurality of tag-reader distances and one or more orientations with respect to the RFID reader, wherein the tag-reader distance is the distance between an RFID reader and an RFID tag; and fit the RSS measurements of the subset of RFID tags to an RSS decay model that relates increasing tag-reader distance to decreasing RSS.

Example 93

The method of using any of the devices, systems, or its components provided in any combination of one or one or more of examples 44-86.

Example 94

The method of manufacturing any of the devices, systems, or its components provided in any combination of one or more of examples 44-86.

It should be appreciated that the machine-readable medium disclosed in examples 87-92 may be configured to execute the subject matter of any combination of one or more of the methods disclosed in examples 1-43 as desired, required, or needed.

Example 95

An aspect of an embodiment of the present invention provides, among other things, systems, methods, and machine readable media that enable object localization with an RFID infrastructure. Localization is performed by modeling the distance-decaying behavior of received signal strength. Selection of optimally performing tag types and the use of uniformly sensitive tags of those optimal tag types further enhances localization accuracy. When these components are combined, RFID becomes a feasible way to locate moving and stationary objects in a 3D environment that includes other objects, as well as noise and signal pollution.

REFERENCES

The following patents, applications and publications as listed below and throughout this document are hereby incorporated by reference in their entirety herein. The devices, systems, computer readable medium, and methods of various embodiments of the invention disclosed herein may utilize aspects disclosed in the following references, applications, publications and patents and which are hereby incorporated by reference herein in their entirety (and which are not admitted to be prior art with respect to the present invention by inclusion in this section):

[1] [WEB] Alien Technology, ALR 9900+ UHF RFID Reader, URL: www.alientechnology.com/readers/alr9900.php

[2] D. D. Arumugam and D. W. Engels, "Characteristics of Passive UHF RFID Tags on Metal Slabs", Proc. of the IEEE Antennas and Propagation Society International Symposium, South Carolina, 2009, pp. 1-4.

[3] A. Bekkali, H. Sanson, and M. Matsumoto, "RFID Indoor Positioning based on Probabilistic RFID Map and Kalman Filtering", Proc. of the IEEE International Conference on Wireless and Mobile Computing, Networking and Communications, New York, 2007, pp. 21-27.

[4] L. Bolotnyy and G. Robins, "The Case for Multi-tag RFID Systems", Proc. of the IEEE International Conference on Wireless Algorithms, Systems and Applications, Chicago, 2007, pp. 174-186.

[5] L. Bolotnyy and G. Robins, "Multi-Tag RFID Systems", Proc. of the International Journal of Internet Protocol Technology, special issue on RFID: Technologies, Applications, and Trends, Vol. 2, No. 3/4, December, 2007, pp. 218-231.

[6] M. Bouet and A. L. dos Santos, "RFID Tags: Positioning Principles and Localization Techniques", Proc. of the Wireless Days, Dubai, UAE, 2008, pp. 1-5.

[7] J. L. Brchan, Z. Lianlin, J. Wu, R. E. Williams, and L. C. Perez, "A Real-Time RFID Localization Experiment Using Propagation Models", Proc. of the IEEE International Conference on RFID, Florida, 2012, pp. 141-148.

[8] K. Chawla and G. Robins, "An RFID-Based Object Localisation Framework", Proc. of the International Journal on Radio Frequency Identification Technology and Applications, Vol. 3, Nos. 1/2, 2011, pp. 2-30.

[9] J. S. Choi, H. Lee, R. Elmasri, and D. W. Engels, "Localization Systems Using Passive UHF RFID", Proc. of the IEEE International Joint Conf. on INC, IMS and IDC, Seoul, South Korea, 2009, pp. 1727-1732.

[10] K. Finkenzeller, "RFID-Handbook: Fundamentals and Applications in Contactless Smart Cards and Identification", Wiley and Sons Inc., Second Edition, 2003.

[11] T. He, C. Huang, B. Blum, J. Stankovic, and T. Abdelzaher, "Range-Free Localization and its Impact on Large Scale Sensor Networks", Proc. Of the ACM Transactions on Embedded Computing Systems, Vol. 4, Issue. 4, 2005, pp. 877-906.

[12] J. Hightower and G. Borriello, "Location Systems for Ubiquitous Computing", Proc. of the IEEE Computer, Vol. 34, No. 8, 2001, pp. 57-66.

[13] L. Ni, Y. Liu, Y. Lau, and A. Patil, "LANDMARC: Indoor Location Sensing Using Active RFID", Proc. of the IEEE International Conference on Pervasive Computing, Texas, 2003, pp. 407-415.

[14] P. V. Nikitin and K. V. S. Rao, "Antennas and Propagation in UHF RFID Systems", Proceeding of the IEEE International Conference on RFID, Nevada, 2008, pp. 277-288.

[15] G. Retscher and Q. Fu, "Integration of RFID, GNSS and DR for Ubiquitous Positioning in Pedestrian Navigation", Proc. of the Journal of Global Positioning Systems, Vol. 6, No. 1, 2007, pp. 56-64.

[16] [WEB] RFCode, Sensor Tags, URL: www.rfcode.com/Products/Sensor-Tags/Sensor-Tags.html

[17] K. Saarinen, L. Frisk, and L. Ukkonen, "Effects of Cycling Humidity on the Performance of RFID Tags With ACA Joints", Proc. of the IEEE Transactions on Reliability, Vol. 61, No. 1, 2012, pp. 23-31.

[18] [WEB] ThingMagic, Mercury6 UHF RFID Reader, URL: www.thingmagic.com/fixed-rfid-readers/mercury6

[19] Z. Yang and Y. Liu, "Quality of Trilateration: Confidence-Based Iterative Localization", Proc. of the IEEE Transactions on Parallel and Distributed Systems, Vol. 21, No. 5, 2010, pp. 631-640

[20] International Patent Application Serial No. PCT/US2011/053067, Chawla, et al., entitled "Object Localization with RFID Infrastructure," filed Sep. 27, 2010

[21] U.S. patent application Ser. No. 13/876,078, Chawla, et al., "Object Localization with RFID Infrastructure," filed Mar. 26, 2013.

[22] Chong Wang, et al., "RFID-Based 3-D Positioning Schemes", IEEE 2007, pp. 1235-1243.

[23] International Patent Application Publication No. WO 2007/061836 A2, Lyon, G., et al., "Method and Apparatus for Localization of RFID Tags", May 31, 2007.

[24] Jiaqing Wu, "Three-Dimensional Indoor RFID Localization System", Dissertation, 12-1-12, University of Nebraska.

[25] Zhang, Y., et al., "Localization and Tracking of Passive RFID Tags Based on Direction Estimation", International Journal of Antennas and Propagation, Vol. 2007, Article ID 17426, pp. 1-9.

[26] Hanel, D., et al., "Mapping and Localization with RFID Technology", Proceedings of 2004 IEEE International Conf., pp. 1015-1020.

[27] Heikimian-Williams, C., et al., "Accurate Localization of RFID Tags Using Phase Difference", IEEE RFID 2010, pp. 89-96.

[28] Hightower, J., et al., "SpotON: An Indoor 3D Location Sensing Technology Based on RF Signal Strength", UW CSE Tech. Report #2000-02-02, 2/18/00, pp. 1-16.

[29] Bouet, M., et al., "RFID Tags: Positioning Principles and Localization Techniques", IEEE 2008.

[30] Ni, Lionel M., et al., "LANDMARC: Indoor Location Sensing Using Active RFID", Wireless Networks 10, 2004, pp. 701-710.

[31] Chawla, K., et al., "Efficient RFID-Based Mobile Object Localization", IEEE 2010, pp. 683-690.

[32.] U.S. Pat. No. 7,119,738 B2, Bridgelall, et al., "Object Location System and Method Using RFID", Oct. 10, 2006.

[33] U.S. Patent Application No. US2008/0061939 A1, Davis, et al., "Method and Apparatus for Determining Ordering of RFID Tagged Objects", Mar. 13, 2008.

[34] Chawla, K., et al., "Object Localization Using RFID", 2010 5$^{th}$ Int.l. IEEE ISWPC, pp. 301-306.

[35] U.S. Pat. No. 7,295,114 B1, Drzaic, et al., "Location Management For Radio Frequency Identification Readers", Nov. 13, 2007.

[36] U.S. Pat. No. 7,486,189 B2, Koerner, et al., "RFID Systems and Methods Employing Infrared Localization", Feb. 3, 2009.

[37] U.S. Pat. No. 7,522,926 B2, Chu, et al., "Location Identification", Apr. 21, 2009.

[38] U.S. Pat. No. 7,619,532 B2, "Amir, "Dual Antenna Base Station For Improved RFID Localization", Nov. 17, 2009.

[39] U.S. Pat. No. 7,683,782 B2, Christopher, "RFID Entity Locating System", Mar. 23, 2010.

[40] U.S. Pat. No. 7,693,681 B2, Yamada, "System for Determining Three Dimensional Position of Radio Transmitter", Apr. 6, 2010.

[41] International Patent Application Publication No. WO 2007/131839 A1, Bauchot, et al., "Method and Systems for Localizing Objects Using Passive Red TAGs", Nov. 22, 2007; International Patent Application Serial No. PCT/EP2007/053334, filed Apr. 4, 2007.

[42] International Patent Application Publication No. WO 2009/018156 A1, Cristache, "Systems and Methods for Object Localization and Path Identification Based on RFID Sensing", Feb. 5, 2009; International Application Serial No. PCT/US2008/071202, filed Jul. 25, 2008.

[43] International Patent Application Publication No. WO 2010/011176 A1, Goh, et al., "A Method and a System for Determining the Location of a Subject, and a Radio Frequency Identification Tag Assembly", Jan. 28, 2010; International Patent Application Serial No. PCT/SG2008/000267, filed Jul. 23, 2008.

[44] U.S. Patent Application Publication No. US 2007/0115137 A1, Lyon, et al., "Method and Apparatus for Localization of RFID Tags", May 24, 2007; U.S. application Ser. No. 11/285,370, filed Nov. 21, 2005.

[45] U.S. Patent Application Publication No. US 2008/0278289 A1, Gantner, "Method for the Operation of an RFID Tag with Precise Localization", Nov. 13, 2008; U.S. application Ser. No. 12/112,064, filed Apr. 30, 2008.

[46] U.S. Patent Application Publication No. US 2009/0315679 A1, Bauchot, et al., "Location Localization Method and System", Dec. 24, 2009; U.S. application Ser. No. 12/180,664, filed Jul. 28, 2008.

[47] U.S. Pat. No. 6,641,042 B1, Pierenkemper, et al., "Method and an Apparatus for the Identification and Localization of Objects", Nov. 4, 2003.

[48] U.S. Pat. No. 7,374,103 B2, Genc, et al., "Object Localization", May 20, 2008.

[49] U.S. Pat. No. 7,319,397 B2, Chung, et al., "RFID Device for Object Monitoring, Locating, and Tracking", Jan. 15, 2008.

[50] U.S. Pat. No. 7,605,688 B1, Seah, "Vehicle Location Determination System Using an RFID System", Oct. 20, 2009.

[51] U.S. Patent Application Publication No. US 2006/0273903 A1, "Apparatus for Identifying Objects Using Radio Frequency and Apparatus and Method for Tracking Position of Object Using the Same", Dec. 7, 2006; U.S. patent application Ser. No. 11/295,773, filed Dec. 7, 2005.

[52] U.S. Pat. No. 7,246,746 B2, "McNamara, et al., "Integrated Real-Time Automated Location Positioning Asset Management System", Jul. 24, 2007.

[53] U.S. Patent Application Publication No. US 2006/0125694 A1, Dejanovic, et al., "Location Determination Method and System for Asset Tracking Devices", Jun. 15, 2006; U.S. patent application Ser. No. 11/194,116, filed Jul. 30, 2005.

[54] U.S. Patent Application Publication No. US 2008/0100439 A1, Rinkes, "Radio Frequency Identification (RFID) Tag Location Systems and Methods", May 1, 2008; U.S. patent application Ser. No. 11/589,938, filed Oct. 31, 2006.

[55] U.S. Pat. No. 5,977,913 A, Christ, "Method and Apparatus for Tracking and Locating Personnel", Nov. 2, 1999.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims and within the disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method of selecting a type of radio-frequency identification (RFID) tag, the method comprising:
    providing a plurality of RFID tags, wherein the plurality of RFID tags is comprised of at least two different RFID tag types;
    measuring the received signal strength (RSS) of respective ones of the plurality of RFID tags for at least one RFID reader transmit power level of an RFID reader, and at least one reader-tag distance, wherein the reader-tag distance is the distance between the RFID reader and a respective RFID tag amongst the plurality of RFID tags; and
    analyzing the measured RSS of the respective ones of the plurality of RFID tags by evaluating the measured RSS for each of the respective ones of the plurality of RFID tags with respect to at least one metric, and in response, selecting an RFID tag type from amongst the at least two different RFID tag types.

2. The method of claim 1, wherein said analyzing includes determining which of said different RFID tag types has the least variation between measured RSS over the different RFID reader output power levels.

3. The method of claim 1, wherein said analyzing includes determining which of the at least two different RFID tag types has the highest correlation between increases in reader-tag distance and decreases in measured RSS.

4. The method of claim 1, wherein said analyzing includes determining which of the at least two different RFID tag types has the longest read range.

5. The method of claim 1, wherein said analyzing includes determining which of the at least two different RFID tag types has the highest read count.

6. The method of claim 1, wherein the plurality of RFID tags are passive.

7. The method of claim 1, wherein the plurality of RFID tags are active.

8. The method of claims 1, wherein the plurality of RFID tags are semi-passive.

9. The method of claim 1, wherein the plurality of RFID tags are at least one of passive, active, semi-passive, or any combination thereof.

10. The method of claim 1, wherein said analyzing comprises selecting two or more optimal RFID tag types.

11. The method of claim 1, further comprising:
    identifying a subset of RFID tags of the selected RFID tag type that perform closest to the mean on a particular one of the at least one metric.

12. The method of claim 11, wherein said particular one of the at least one metric is measured RSS.

13. The method of claim 11, wherein said particular one of the at least one metric is measured read-count.

14. The method of claim 12, wherein the subset of RFID tags are the RFID tags that have measured RSS within a predetermined number of standard deviations from the mean.

15. The method of claim 12, wherein the subset of RFID tags are the RFID tags that have measured RSS within a user-defined number of standard deviations from the mean.

16. The method of claim 15, wherein said user-defined number of standard deviations comprises two standard deviations from the mean.

17. The method of claim 11, further comprising:
    developing an RSS decay model that relates increasing tag-reader distance to decreasing RSS, using the measured RSS of said subset of RFID tags at a plurality of tag-reader distances.

18. The method of claim 17, wherein said RSS decay model is an exponential decay formula created with a least-squares fitting.

19. The method of claim 18, wherein goodness of the fit of said least-squares fitting is determined using an $R^2$ metric.

20. The method of claim 18, wherein goodness of the fit of said least-squares fitting is determined using a normalized root-mean-square error (NRMSE) metric.

21. The method of claim 17, wherein said exponential decay formula is:

$$RSS = C*D^E$$

wherein:
    C is a coefficient,
    D is a tag-reader distance, and
    E is an exponent.

22. The method of claim 17, wherein the RSS of said subset of RFID tags is also measured at a plurality of tag orientations with respect to the RFID reader.

23. The method of claim 22, wherein said plurality of tag orientations are axial, radial, or both.

24. The method of claim 1, further comprising:
    developing an RSS decay model that relates increasing tag-reader distance to decreasing RSS, using the measured RSS of one or more RFID tags of said optimal RFID tag type at a plurality of tag-reader distances.

25. The method of claim 24, wherein said RSS decay model is an exponential decay formula created with a least-squares fitting.

26. The method of claim 25, wherein goodness of the fit of said least-squares fitting is determined using an $R^2$ metric.

27. The method of claim 25, wherein goodness of the fit of said least-squares fitting is determined using a normalized root-mean-square error (NRMSE) metric.

28. The method of claim 24, wherein said exponential decay formula is:

$$RSS = C * D^E$$

wherein:
C is a coefficient,
D is a tag-reader distance, and
E is an exponent.

29. The method of claim 24, wherein the RSS is also measured at a plurality of tag orientations with respect to the RFID reader.

30. The method of claim 29, wherein said plurality of tag orientations are axial, radial, or both.

31. A method of developing a received signal strength (RSS) decay model for a radio-frequency identification (RFID) system, the method comprising:
    measuring RSS of one or more RFID tags at a plurality of tag-reader distances and a plurality of orientations with respect to an RFID reader, wherein the tag-reader distance is the distance between the RFID reader and a respective RFID tag of the one or more RFID tags; and
    fitting said RSS measurements to an exponential decay formula to provide said RSS decay model, wherein said exponential decay formula relates increasing tag-reader distance to decreasing RSS.

32. The method of claim 31, wherein said one or more RFID tags measured are passive.

33. The method of claim 31, wherein said one or more RFID tags measured are active.

34. The method of claim 31, wherein said one or more RFID tags measured are semi-passive.

35. The method of claim 31, wherein said fitting is a least-squares fitting.

36. The method of claim 35, wherein goodness of the fit of said least-squares fitting is determined using an $R^2$ metric.

37. The method of claim 35, wherein goodness of the fit of said least-squares fitting is determined using a normalized root-mean-square error (NRMSE) metric.

38. The method of claim 31, wherein said exponential decay formula is:

$$RSS = C * D^E$$

wherein:
C is a coefficient,
D is a tag-reader distance, and
E is an exponent.

39. The method of claim 31, wherein the orientation of said one or more RFID tags is axial.

40. The method of claim 31, wherein the orientation of said one or more RFID tags is radial.

41. The method of claim 31, wherein the orientation of said one or more RFID tags is axial and radial.

42. The method of claim 31, wherein said fitting separates RSS measurements at different orientations, creates a preliminary decay model for each orientation, and averages the preliminary decay models to create said RSS decay model.

43. The method of claim 31, wherein said fitting of said RSS measurements comprises averaging all RSS measurements at each tag-reader distance and creating said RSS decay model using the average RSS measurements.

44. A system comprising:
    a tag testing circuit configured to measure the received signal strength (RSS) of respective ones of a plurality of RFID tags for at least one RFID reader transmit power level of an RFID reader and at least one reader-tag distance, wherein the plurality of RFID tags is comprised of at least two different RFID tag types; and
    a tag selection circuit configured to analyze the measured RSS of the respective ones of the plurality of RFID tags by evaluating the measured RSS for each of the plurality of RFID tags with respect to at least one metric, and in response, selecting an RFID tag type amongst the at least two different RFID tag types.

45. The system of claim 44, wherein said tag selection circuit is configured to determine which of at least two different RFID tag types has the least variation between measured RSS over the different RFID reader output power levels.

46. The system of claim 44, wherein said tag selection circuit is configured to determine which of at least two different RFID tag types has the highest correlation between increases in reader-tag distance and decreases in measured RSS.

47. The system of claim 44, wherein said tag selection circuit is configured to determine which of at least two different RFID tag types has the longest read range.

48. The system of claim 44, wherein said tag selection circuit is configured to determine which of at least two different RFID tag types has the highest read count.

49. The system of claim 44, wherein the plurality of RFID tags are passive.

50. The system of claim 44, wherein the plurality of RFID tags are active.

51. The system of claims 44, wherein the plurality of RFID tags are semi-passive.

52. The system of claim 44, wherein the plurality of RFID tags are at least one of passive, active, semi-passive, or any combination thereof.

53. The system of claim 44, wherein said tag selection circuit is configured to select two or more optimal RFID tag types.

54. The system of claim 44, further comprising:
    a binning circuit configured to identify a subset of RFID tags of said optimal RFID tag type that perform closest to the mean on a particular one of the at least one metric.

55. The system of claim 54, wherein said particular one of the at least one metric is measured RSS.

56. The system of claim 54, wherein said particular one of the at least one metric is measured read-count.

57. The system of claim 55, wherein the subset of RFID tags are the RFID tags that have measured RSS within a predetermined number of standard deviations from the mean.

58. The system of claim 55, wherein the subset of RFID tags are the RFID tags that have measured RSS within a user-defined number of standard deviations from the mean.

59. The system of claim 55, wherein said user-defined number of standard deviations comprises two standard deviations from the mean.

60. The system of claim 54, further comprising:
an RSS measurement circuit configured to measure the RSS of said subset of RFID tags at a plurality of tag-reader distances; and
a calibration circuit configured to develop an RSS decay model that relates increasing tag-reader distance to decreasing RSS, using the measurements from said RSS measurement circuit.

61. The system of claim 60, wherein said RSS decay model is an exponential decay formula developed through a least-squares fitting.

62. The system of claim 61, wherein goodness of the fit of said least-squares fitting is determined using an $R^2$ metric.

63. The system of claim 61, wherein goodness of the fit of said least-squares fitting is determined using a normalized root-mean-square error (NRMSE) metric.

64. The system of claim 61, wherein said exponential decay formula is:

$$RSS = C*D^E$$

wherein:
C is a coefficient,
D is a tag-reader distance, and
E is an exponent.

65. The system of claim 60, wherein said RSS measurement circuit is configured to measure the RSS of said subset of RFID tags at a plurality of tag orientations with respect to the RFID reader.

66. The system of claim 65, wherein said plurality of tag orientations are axial, radial, or both.

67. The system of claim 44, further comprising:
an RSS measurement circuit configured to measure the RSS of said subset of RFID tags at a plurality of tag-reader distances; and
a calibration circuit configured to develop an RSS decay model that relates increasing tag-reader distance to decreasing RSS, using the measurements from said RSS measurement circuit.

68. The system of claim 67, wherein said RSS decay model is an exponential decay formula created with a least-squares fitting.

69. The system of claim 68, wherein goodness of the fit of said least-squares fitting is determined using an $R^2$ metric.

70. The system of claim 68, wherein goodness of the fit of said least-squares fitting is determined using a normalized root-mean-square error (NRMSE) metric.

71. The system of claim 67, wherein said exponential decay formula is:

$$RSS = C*D^E$$

wherein:
C is a coefficient,
D is a tag-reader distance, and
E is an exponent.

72. The system of claim 67, wherein the RSS is also measured at a plurality of tag orientations with respect to the RFID reader.

73. The system of claim 72, wherein said plurality of tag orientations are axial, radial, or both.

74. A system comprising:
a received signal strength (RSS) measurement circuit configured to measure the RSS of one or more RFID tags at a plurality of tag-reader distances and a plurality of orientations with respect to an RFID reader, wherein the tag-reader distance is the distance between the RFID reader and a respective RFID tag of the one or more RFID tags; and
a calibration circuit configured to fit said RSS measurements to an exponential decay formula to provide an RSS decay model, wherein said exponential decay formula relates increasing tag-reader distance to decreasing RSS.

75. The system of claim 74, wherein said one or more RFID tags are passive.

76. The system of claim 74, wherein said one or more RFID tags are active.

77. The system of claim 74, wherein said one or more RFID tags are semi-passive.

78. The system of claim 74, wherein said fitting is a least-squares fitting.

79. The system of claim 78, wherein goodness of the fit of said least-squares fitting is determined using an $R^2$ metric.

80. The system of claim 78, wherein goodness of the fit of said least-squares fitting is determined using a normalized root-mean-square error (NRMSE) metric.

81. The system of claim 74, wherein said exponential decay formula is:

$$RSS = C*D^E$$

wherein:
C is a coefficient,
D is a tag-reader distance, and
E is an exponent.

82. The system of claim 74, wherein the orientation of said one or more RFID tags is axial.

83. The system of claim 74, wherein the orientation of said one or more RFID tags is radial.

84. The system of claim 74, wherein the orientation of said one or more RFID tags is axial and radial.

85. The system of claim 74, wherein said fitting separates RSS measurements at different orientations, creates a preliminary decay model for each orientation, and averages the preliminary decay models to create said RSS decay model.

86. The system of claim 74, wherein said fitting comprises averaging all RSS measurements at each tag-reader distance and creating said RSS decay model using the average RSS measurements.

* * * * *